United States Patent [19]
Hull

[11] Patent Number: 5,261,359
[45] Date of Patent: Nov. 16, 1993

[54] RECIPROCATING 2-STROKE CYCLE INTERNAL COMBUSTION ENGINE

[76] Inventor: Francis R. Hull, 567 E. 26th St., Brooklyn, N.Y. 11232

[21] Appl. No.: 739,527

[22] Filed: Aug. 2, 1991

Related U.S. Application Data

[63] Continuation-in-part of Ser. No. 581,666, Sep. 13, 1990, abandoned.

[51] Int. Cl.⁵ .................... F01L 15/02; F02M 31/093
[52] U.S. Cl. ................... 123/65 V; 123/547; 123/188.4
[58] Field of Search ............ 123/59 AB, 188.5, 65 R, 123/65 V, 65 P, 73 A, 81 R, 65 BA, 547, 188.4

[56] References Cited

U.S. PATENT DOCUMENTS

| | | | |
|---|---|---|---|
| 1,161,223 | 11/1915 | Koken et al. | 123/59 AB |
| 1,161,224 | 11/1915 | Koken et al. | 123/59 AB |
| 1,193,903 | 8/1916 | Koken | 123/59 AB |
| 1,227,169 | 5/1917 | Medanich | 123/59 AB |
| 1,537,248 | 5/1925 | Maloney | 123/59 AB |
| 1,612,550 | 12/1926 | Tom | 123/59 AB |
| 1,618,687 | 2/1927 | Swanstrom | 123/59 AB |
| 1,697,931 | 1/1929 | Schmidt | 123/59 AB |
| 1,829,581 | 10/1931 | Buck | 123/59 AB |
| 2,271,015 | 1/1942 | Jackson | 123/65 A |
| 4,170,203 | 10/1979 | Congram et al. | 123/547 |
| 4,200,070 | 4/1980 | Racine | 123/547 |
| 4,637,365 | 1/1987 | Yunick | 123/547 |
| 4,817,566 | 4/1989 | Newman | 123/547 |
| 4,966,104 | 10/1990 | Hundleby | 123/73 C |

FOREIGN PATENT DOCUMENTS

| | | | |
|---|---|---|---|
| 32543 | 12/1884 | Fed. Rep. of Germany | 123/188.5 |
| 213573 | 6/1925 | United Kingdom | 123/188.5 |

Primary Examiner—Willis R. Wolfe

[57] ABSTRACT

A superchargeable multi-cylinder 2-stroke cycle internal combustion engine employs opposite reciprocating mult-port slide valves in guideways on opposite sides of the engine block, to open and close cylinder air supply and combustion gas discharge conduits in several variations. Use of opposite multi-port slide valves driven from the engine crankshaft simplifies engine design, and improves scavenging of combustion gases from piston chambers of either spark-ignition or diesel engines. A preferred variation channels air supply and combustion gas discharge flows through dual passageways of opposite air preheating manifolds, to increase engine fuel efficiency. Further development of the preferred variation can result in production of simplified, compact, supercharged 2-stroke spark-ignition and diesel engines of improved design.

54 Claims, 3 Drawing Sheets

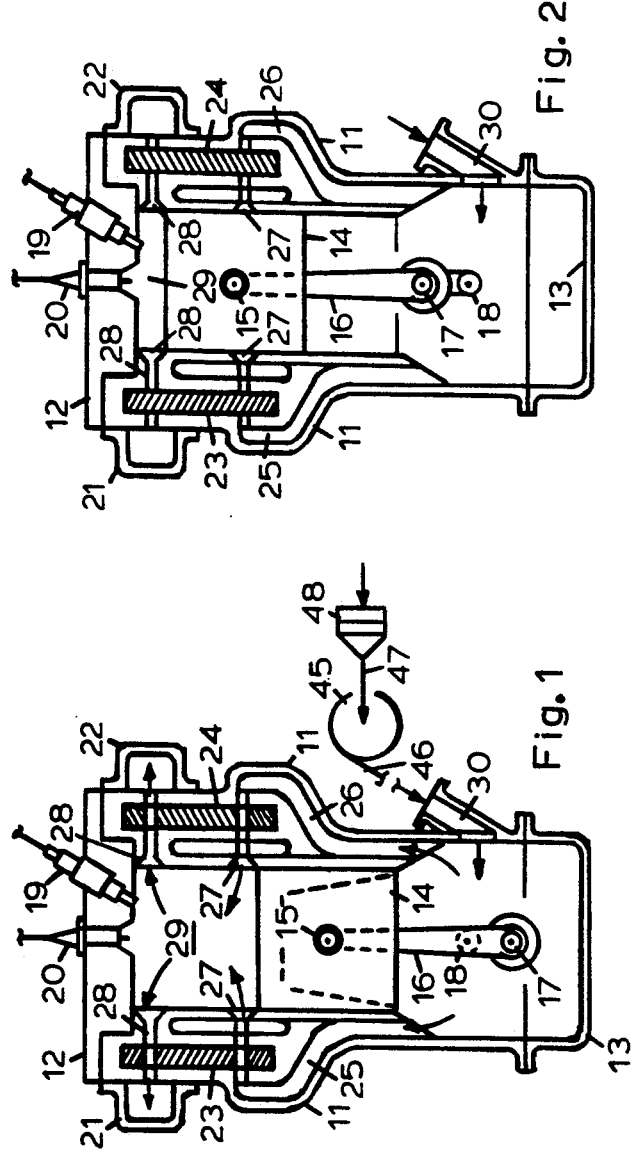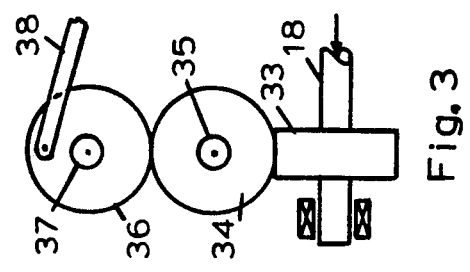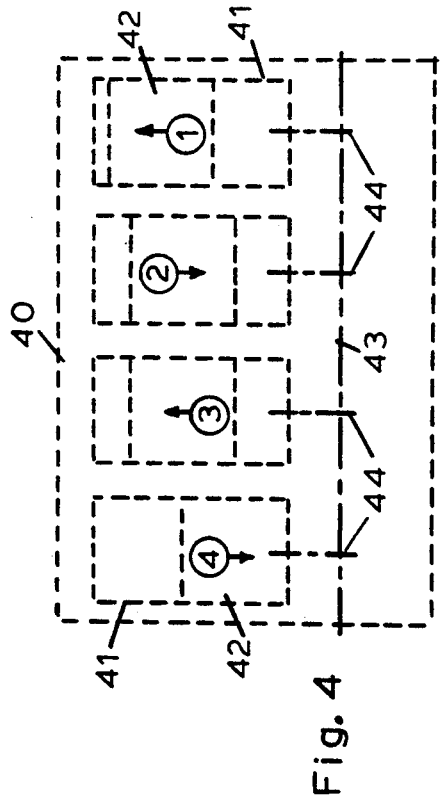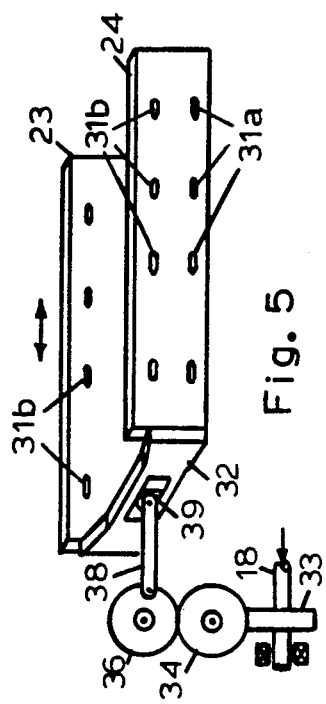

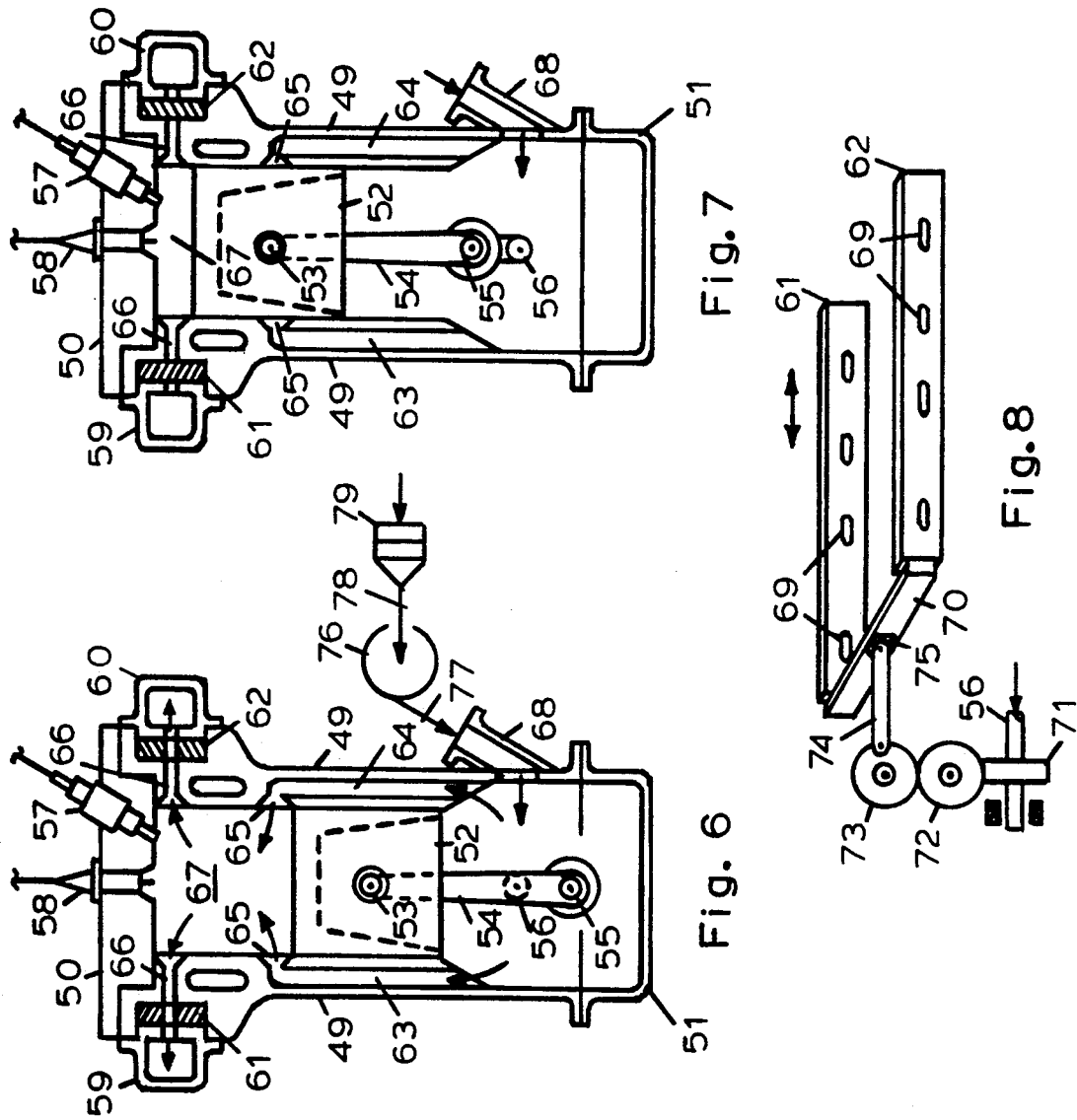

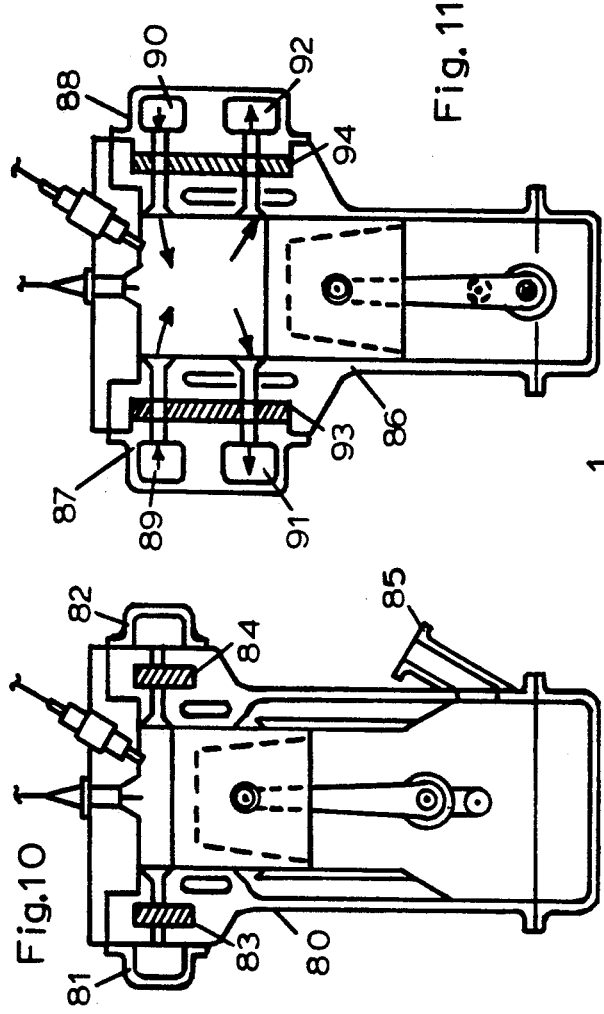
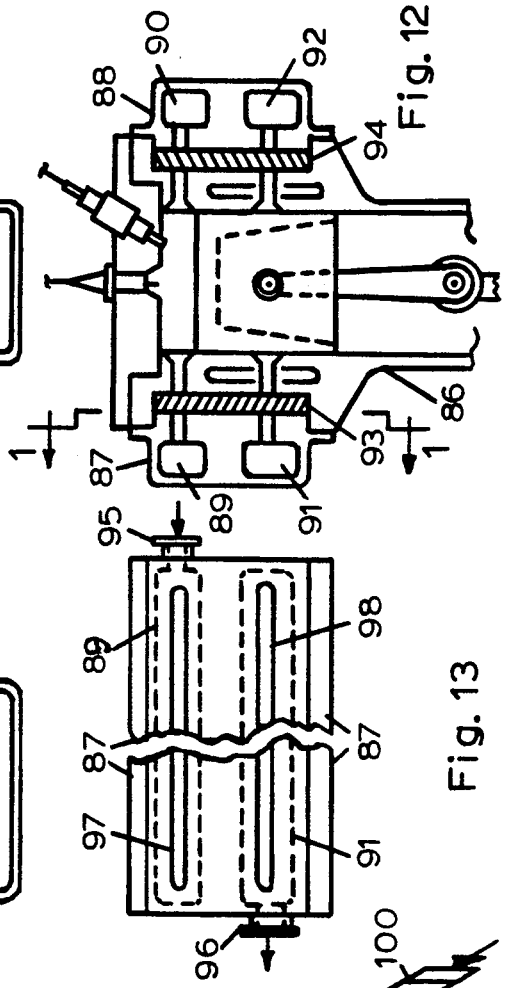
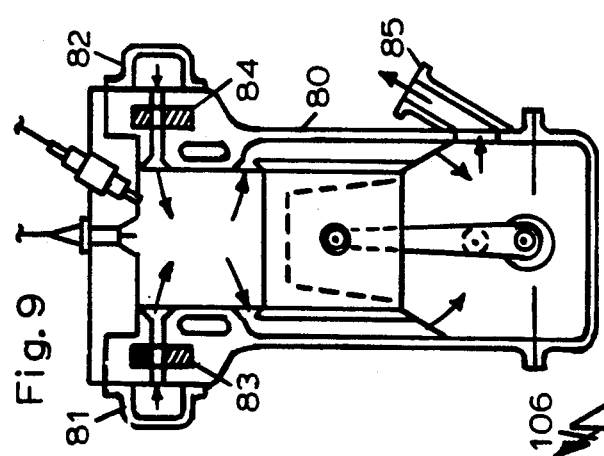
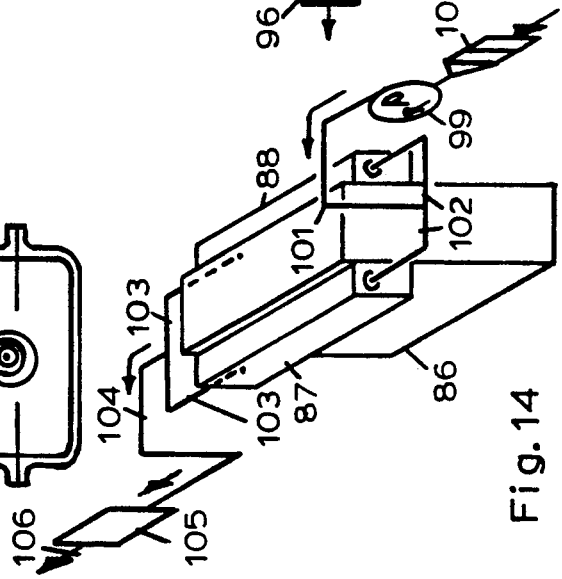

RECIPROCATING 2-STROKE CYCLE INTERNAL COMBUSTION ENGINE

STATEMENT AS TO RIGHTS

This invention was not made under any Federally sponsored research and development, and rights to the invention are presently unencumbered.

This application is a continuation-in-part of my presently pending application Ser. No. 581,,666 entitled "Reciprocating 2-Stroke Cycle Internal Combustion Engine", filed Sep. 13, 1990, now abandoned.

BACKGROUND OF THE INVENTION

1. Field Of The Invention

This invention relates to multi-cylinder 2-stroke cycle internal combustion engines having an opposite pair of multi-port slide valves which reciprocate together in guideways on opposite sides of the engine block to cyclically open and close cylinder air supply and combustion gas discharge conduits, and to multi-cylinder 2-stroke cycle engines having opposite air preheating manifolds with dual fluid passageways confining flows of incoming combustion air and outgoing combustion exhaust gases.

2. Description of the Prior Art

Use of opposite reciprocating multi-port slide valves to open and close cylinder air supply and combustion gas discharge conduits on opposite sides of reciprocating multi-cylinder internal combustion engine blocks is presently unpracticed in the engine arts. Use of opposite air preheating manifolds with dual fluid passageways confining flows of incoming combustion air and outgoing combustion exhaust gases disposed on opposite sides of reciprocating multi-cylinder internal combustion engine blocks is presently unpracticed in the engine arts.

Poppet-type valves have been widely used for air inlet and combustion gas outlet control of piston chambers in 2-stroke and 4-stroke cycle engines. Multiple poppet valve systems serving multi-cylinder engines have complex mechanical operators which employ rotating camshafts, rocker arms, springs, guides, gear trains, etc. and other drive mechanisms driven from the engine crankshaft.

Cylinder port valves which are covered and uncovered by a moving piston are used by designers of both spark-ignition and diesel engines. Where cylinder-port valves are used for both air admission and combustion gas discharge of piston chambers, the head surfaces of the pistons and the inner surfaces of the cylinder head are usually contoured to obtain a scavenging gas flow reversal at the bottom dead-center position in the piston chambers.

Sleeve-type and reed-type valves have also found use in engine designs, usually for controlling the scavenging discharge flow of combustion gases from piston chambers.

SUMMARY OF THE INVENTION

Several variations of a multi-cylinder internal combustion engine are disclosed, which employ a yoked pair of reciprocating multi-port slide valves to cyclically open and close air supply and combustion gas discharge conduits of the piston chambers from opposite sides of the engine block. In an extended piston chamber, scavenging or purging of spent combustion gases is more completely accomplished with lesser friction losses when combustion air enters from opposite ports at one end, while the spent combustion gases with scavenging air are discharged through plural ports at the other end of the piston chamber. The yoked pair of multi-port slide-valve members may be simply driven by a crank-and-slider bevel-gear mechanism from the engine crankshaft.

In one variation, opposite lower cylinder ports communicate with opposite air supply conduits from the engine crankcase and opposite upper cylinder ports communicate with opposite combustion gas manifolds., by way of ports of the reciprocating multi-port slide valve members when engine pistons are near their bottom dead-center cyclic positions. In a second variation, lower cylinder ports are uncovered by the pistons near their bottom dead-center positions to admit combustion air from the crankcase, while combustion gas scavenge flows are discharged through opposite upper cylinder ports and ports of the reciprocating slide-valve members. In a third variation, opposite upper cylinder ports are opened through ports of the reciprocating slide-valve members to admit combustion air, while lower cylinder ports uncovered by the pistons discharge combustion gas scavenge flows into the engine crankcase. In a fourth preferred variation, both combustion air and hot engine exhaust gases flow through dual passageways of opposite air preheating manifolds, preheated combustion air enters piston chambers from opposite upper cylinder ports via ports of the reciprocating slide-valve members, and hot combustion gas scavenge flows are discharged through opposite lower cylinder ports and through ports of the reciprocating slide-valve members.

The preferred fourth variation of the invention is disclosed in connection with the illustrative embodiments of FIGS. 11-14 inclusive.

Use of a yoked pair of reciprocating multi-port slide valves to open and close air supply conduits and combustion gas discharge conduits serving piston chambers of a multi-cylinder engine from opposite sides of the engine block has a number of advantages. These advantages include:

(1) Multi-cylinder engine design and maintenance is simplified by eliminating use of multiple poppet valves and their complex operating mechanisms.

(2) The reciprocating multi-port slide valves can be driven with a single-acting power train from the engine crankshaft.

(3) Uni-directional scavenging gas flow from opposite cylinder ports at one end of a piston chamber to opposite cylinder ports at the other end of the piston chamber is obtained without flow reversals, leading to lesser friction losses and a more complete purging of spent combustion gases from the piston chamber.

(4) Ports in reciprocating slide-valve members can be given any suitable configuration and spacing to cyclically open and close air supply and combustion gas discharge conduits in any desired sequence.

(5) Slide-valve members can be fabricated of lightweight composite materials which are self-lubricating.

Use of opposite air preheating manifolds having dual fluid passageways confining flows of incoming combustion air and outgoing combustion exhaust gases increases engine thermal efficiency and conserves energy by transferring heat to cool incoming combustion air from hot engine exhaust gases.

BRIEF DESCRIPTION OF THE DRAWINGS

FIG. 1 is a sectional elevation of a 2-stroke engine with a piston chamber in the bottom dead-center positions and with opposite slide valves opening its air supply and combustion gas discharge conduits.

FIG. 2 is a sectional elevation of the 2-stroke engine of FIG. 1 with the piston chamber in the top dead-center position, and with the opposite slide valves closing its air supply and combustion gas discharge conduits.

FIG. 3 is a schematic of a crankshaft bevel-gear drive train.

FIG. 4 is a schematic diagram showing one possible firing order for a 2-stroke 4-cylinder engine.

FIG. 5 is a schematic of the crank-and-slider drive method from an engine crankshaft for a yoked pair of reciprocating multiport slide valves.

FIG. 6 is a sectional elevation of another 2-stroke cycle engine with a piston chamber in the bottom dead-center position, receiving supply air from lower cylinder ports and with opposite upper slide valves opening its combustion gas discharge conduits.

FIG. 7 is a sectional elevation of the 2-stroke engine of FIG. 6 with the piston chamber in the top dead-center position, and with the opposite upper slide valves closing its combustion gas discharge conduits.

FIG. 8 is a schematic of the crank-and-slider drive method for the yoked pair of reciprocating multi-port slide valves of FIGS. 6 and 7.

FIG. 9 is a sectional elevation of another 2-stroke cycle engine with a piston chamber in the bottom dead-center position, receiving supply air from opposite upper cylinder ports by way of opposite slide valves and discharging spent combustion gases into the engine crankcase via plural lower cylinder ports uncovered by the piston.

FIG. 10 is a sectional elevation of the 2-stroke engine of FIG. 9 with the piston chamber in the top dead-center position, with the opposite upper slide valves having closed cylinder air supply conduits while lower plural exhaust ports are covered by the piston.

FIG. 11 is a sectional elevation of another 2-stroke engine with a piston chamber in the bottom dead-center position, receiving heated supply air from opposite air preheating manifolds via ports of opposite slide valves and opposite upper cylinder ports, and discharging spent combustion gases into exhaust gas passageways of opposite air preheating manifolds via ports of the opposite slide valves and plural lower cylinder ports.

FIG. 12 is a fragmentary sectional elevation of the 2-stroke engine of FIG. 11 with the piston chamber in the top dead-center position, and with all upper and lower cylinder ports closed by the opposite slide-valve members.

FIG. 13 is an interior side elevation of the left-hand air preheating manifold of FIGS. 11 and 12, taken along offset line 1—1.

FIG. 14 is an isometric schematic diagram illustrating gas flows into and out of the 2-stroke engine of FIGS. 11-13, with pressurized combustion air supplied into inlets of opposite air preheating manifolds and spent combustion gases discharged from outlets of the opposite air preheating manifolds and through downstream electrostatic gas treatment apparatus.

The embodiments of FIGS. 1 and 2 disclose transverse sectional elevations of one piston chamber of a 4-cylinder, 2-stroke cycle reciprocating internal combustion engine 11. The cylinder block housing the piston chamber is closed by cylinder head 12 at its upper high-pressure end, and by oil pan 13 at its lower low-pressure crankcase portion. The volume of cylinder cavity 29 substantially varies as piston 14 reciprocates up and down. Piston 14 is shown at the bottom dead-center cyclic position of the power stroke in FIG. 1, and shown at the top dead-center cyclic position of the compression stroke in FIG. 2. Pressurized combustion air: is continuously supplied into the crankcase receiver space below piston 14, from the discharge of blower 45 via supply conduit 46 and air inlet 30.

Reciprocating motion of piston 14 within the cylinder block of engine 11 is transmitted to crank pin 17 of crankshaft 18, causing the crankshaft to rotate. Connecting rod 16 is connected to piston 14 by wrist pin 15 at its upper end, and to crank pin 17 of crankshaft 18 at its lower end. In the 4-cylinder engine embodiments of FIGS. 1 and 2, crank pins 17 for each cylinder may be disposed at a different angle from the vertical about the crankshaft axis, so that each piston 14 transmits its intermittent torque to crankshaft 18 at a different crank angle during a complete crankshaft rotation. It is common practice in the engine arts to vary the firing order of pistons in a multi-cylinder internal combustion engine.

Piston 14 may include common design features such as piston rings, expansion slots, contoured head surfaces, etc. which are not detailed. Piston 14 would ordinarily be designed to be as lightweight as is feasible, to limit inertial loads caused by piston reversals that may be transmitted to bearings.

In FIGS. 1 and 2, similar multi-port slide valves 23,24 reciprocate into the plane of the drawings within cylinder block guideways of engine 11. When piston 14 is near its bottom dead-center cyclic position as in FIG. 1, pressurized combustion air flows from the crankcase plenum into cylinder cavity 29 adjacent the head surface of piston 14 from opposite sides of the piston chamber. The pressurized combustion air flows from the crankcase plenum through open air supply conduits 25,26 and cylinder ports 27 when opposite, inlet ports 31a of reciprocating multi-port slide valve members 23,24 are aligned to permit flow through conduits 25,26. Opposite outlet ports 31b of reciprocating multi-port slide valve members 23,24 are shown as disposed above inlet ports 31a in sets, whose arrangement with respect to each other are determined by the design firing order of engine 11. Inlet ports 31a and outlet ports 31b servicing each piston chamber may simultaneously open air supply conduits 25,26 and combustion gas discharge conduits 28 for an intermittent period, during reciprocation of multi-port slide valve members 23,24. The pressurized combustion air entering cylinder cavity 29 substantially displaces and expels spent combustion gases, while each piston 14 is near its bottom dead-center cyclic position. The spent combustion gases are discharged from each cylinder cavity 29 into exterior exhaust manifolds 21,22 via combustion gas discharge conduits and the corresponding open outlet ports 31b of reciprocating multi-port slide valve members 23,24, In FIG. 2, piston 14 is shown at the top dead-center cyclic position of the compression stroke. The compressed combustion air charge contains a finely dispersed aerosol of liquid fuel, which was discharged into cylinder cavity 29 by high-pressure fuel injector 19. Combustion gas discharge conduits 28 and air supply conduits 25,26 have been closed by motion of reciprocating multi-port slide valve members 23,24. The compressed air-fuel mixture is ignited by spark plug 20 when piston 14 is near the top dead-center position of the compression stroke, substantially increasing the gas pressure within cylinder cavity 29. The increased gas pressure acts against the head surface of piston 14, forcing the piston downwards during the power stroke of the piston cycle.

Inlet ports 31a and outlet ports 31b are orifices which perforate slide valve members 23,24. Ports 31a,31b of a companion cylinder set may be aligned vertically with respect to each other, but may have different configurations. Outlet ports 31b may have larger cross sections, than inlet ports 31a, to assist scavenging while maintaining combustion air pressure above atmospheric within cylinder cavity 29 as spent combustion gases are being discharged during the admission-exhaust interval of the piston cycle. Optimum configurations of ports 31a,31b and arrangement of companion sets of ports 31a,31b with respect to each other in slide valve members 23,24 would likely require experimental determination.

Similar reciprocating multi-port slide valve members 23,24 may be fabricated of metal, and provided with lubricating means within cylinder block guideways of engine 11, An attractive option may be to fabricate slide valve members 23,24 of high-strength carbon fibers which form a rigid, porous matrix impregnated with graphitic lubricants, and make reciprocating multi-port slide valve members 23,24 self-lubricating within cylinder block guideways of engine 11.

It may be feasible to substantially mold the cylinder block of ceramic materials to form a reinforced composite moldment. Work by others has resulted in experimental construction of engines having substantial elements formed of non-metallic compositions. Ceramic engines could theoretically operate at substantially higher operating temperatures than could similar engines formed of castable metals, leading to higher thermal efficiencies and lower fuel consumption.

In FIGS. 1 and 2 combustion air enters air filter 48, and flows into the inlet of blower 45 via suction conduit 47. Pressurized combustion air is supplied into the crankcase receiver of engine 11, by way of discharge conduit 46 and air inlet 30. Blower 45 may be belt driven, and actuated from pulleys driven from one end of crankshaft 180 via a suitable gear train.

FIG. 3 schematically depicts a portion of a crank-and-slider bevel gear mechanism driven from engine crankshaft 18, which may be used to actuate the reciprocation of multi-port slide valve members 23,24 within cylinder block guideways of engine 11. Crankshaft 18 has bevel drive gear 33 suitably mounted at one end thereo, to mesh with and drive bevel idler gear 34 on a 90° skew angle about its non-intersecting shaft member 35. Bevel idler gear 34 meshes with and drives bevel gear 36, which rotates about shaft member 37. Connecting link 38 is pinned at its left-hand end to the side of driven bevel gear member 36 as shown.

FIG. 5 schematically illustrates the entire crank-and-slider bevel-gear mechanism of FIG. 3 as connected to reciprocate multiport slide valve members 23,24 within cylinder block guideways of engine 11. The right-hand end of connecting link 38 is Pinned to pivot about a transverse horizontal axis in fitting 39, which is rigidly attached to yoke member 32. Yoke member 32 is rigidly attached to the left-hand ends of reciprocating multi-port slide valve members 23,24. As crankshaft 18 rotates, its rotary motion is transmitted via bevel gears 33,34,36 to connecting link 38, causing yoked multi-port slide valve members 23,24 to slideably reciprocate within cylinder block guideways of engine 11. If bevel gear train members are equal with equal pitch diameters, multi-port slide valve members 23,24 will continuously complete each reciprocating cycle in conjunction with each complete rotation of the driving engine crankshaft 18.

FIG. 4 schematically depicts a typical firing order of a 4-cylinder 2-stroke cycle internal combustion engine. Engine envelope 40 encloses four cylinder cavities 41 having pistons 42 reciprocating therewithin on vertical cylinder axes 44. The engine crankshaft rotates about horizontal axis 43. Pistons 42 are numbered from right-to-left in FIG. 4. The right-hand piston (1) is being fired at the top dead-center position. The middle-right piston (2) is descending on its power stroke. The middle-left piston (3) is ascending on its compression stroke. The left-hand piston (4) is at its bottom dead-center position. The firing order of the 4-cylinder 2-stroke cycle engine depicted in FIG. 4 is 1-3-4-2.

Compression-ignition engines (also known as Diesel engines) compress combustion air to a small volume within a piston chamber (or cylinder cavity) of an internal combustion engine. The compression work done by the piston is transformed to heat, causing the combustion air temperature to exceed the ignition temperature of the fuel in use. The liquid fuel is injected into the piston chamber as a mist or aerosol, during the compression stroke of the piston. The compressed air-fuel mixture spontaneously ignites near the top dead-center position, and combustion continues until either the available fuel or oxygen is depleted. If engine 11 (FIGS. 1 and 2) or engine 49 (FIGS. 6 and 7) operated as compression-ignition engines, their pistons would closely approach their cylinder heads at the top dead-center cyclic positions. Spark plugs 20 (FIGS. 1 and 2) and 58 (FIGS. 6 and 7) would be omitted from the respective cylinder heads 12 and 50 if engines 11 and 49 were compression-ignition engines.

The embodiments of FIGS. 6 and 7 disclose transverse sectional elevations of one piston chamber, wherein the method of introducing scavenging combustion air into cylinder cavity 67 varies from the method disclosed in FIGS. 1 and 2. The cylinder block housing the piston chamber is closed by cylinder head 50 at its upper high-pressure end, and by oil pan 51 at its lower low-pressure crankcase portion. The volume of cylinder cavity 67 substantially varies as piston 52 reciprocates up and down. Piston 52 is shown at the bottom dead-center cyclic position of the power stroke in FIG. 60 and shown at the top dead-center cyclic position of the compression stroke in FIG. 7. Pressurized combustion air is continuously supplied into the crankcase receiver space below piston 52, from the discharge of blower 76 via supply conduit 77 and air inlet 68.

Reciprocating motion of piston 52 within the cylinder block of engine 49 is transmitted to crank pin 55 of crankshaft 56,, causing the crankshaft to rotate. Connecting rod 54 is connected to piston 52 by wrist pin 53 at its upper end, and to crank pin 55 of crankshaft 56 at its lower end. In a multi-cylinder engine, crank pins 55 for each cylinder may be disposed at a different angle from the vertical about the crankshaft axis with respect to each other, so that each piston 52 transmits its intermittent torque to crankshaft 56 at a different crank angle during a complete crankshaft rotation.

Piston 52 may include common design features such as piston rings, expansion slots, contoured head surfaces, etc. which are not detailed, Piston 52 would ordinarily be designed as lightweight as is feasible, to limit inertial loads caused by piston reversals that may be transmitted to bearings.

In FIGS. 6 and 7, multi-port slide valves 61,,62 reciprocate into the plane of the drawings within cylinder block guideways of engine 49. When piston 52 is near its bottom dead-center cyclic position as in FIG. 6, cylinder ports 65 are uncovered by piston 52. Pressurized combustion air flows from the crankcase plenum through air supply conduits 63,64 into cylinder cavity 67, adjacent the head surface of piston 52 from opposite sides of the piston chamber. Simultaneously with the admission of pressurized combustion air from cylinder ports 65 into cylinder cavity 67, spent combustion gases are displaced and scavenged from the piston chamber by the entering combustion air. The spent combustion gases are discharged from the piston chamber through combustion gas discharge conduits 66 into exterior exhaust manifolds 59,60 via open outlet ports 69 of reciprocating multi-port slide valve members 61,62.

In FIG. 7, piston 52 is shown at the top dead-center cyclic position of the compression stroke. The compressed combustion air charge contains a finely dispersed aerosol of liquid fuel, which was discharged into cylinder cavity 67 by high-pressure fuel injector 57, Cylinder air ports 65 have been closed by the cylindrical sidewall of piston 52, while combustion gas discharge conduits 66 have been closed by movement of reciprocating multi-port slide valve members 61,62. The compressed air-fuel mixture is ignited by spark plug 58 when piston 52 is near the top dead-center position of the compression stroke, substantially increasing the gas pressure within cylinder cavity 67. The increased gas pressure acts against the head surface of piston 52, forcing the piston downwards during the power stroke of the piston cycle.

Outlet ports 69 are orifices which perforate slide valve members 61,62. Outlet ports 69 may have larger areal cross sections than those of cylinder ports 65, and yet maintain a substantial combustion air pressure above atmospheric within cylinder cavity 67 during the scavenging discharge of spent combustion gases from cylinder cavity 67.

Reciprocating multi-port slide valve members 61,62 may be fabricated of metal, and provided with lubricating means within cylinder block guideways of engine 49. It may also be feasible to fabricate slide valve members 61,62 of high-strength carbon fibers which form a rigid, porous matrix impregnated with graphitic lubricants, and make reciprocating multi-port slide valve members 61,,62 self-lubricating within cylinder block guideways of engine 49.

FIG. 8 schematically depicts a crank-and-slider gear mechanism which is of similar concept to the embodiment of FIG. 5. Bevel drive gear 71 is attached to crankshaft 56, and drives bevel idler gear 72 at a 90° skew angle. Bevel idler gear 72 drives bevel gear member 73, which has the left-hand end of connecting link 74 pinned to its sidewall near its outer periphery. Connecting link 74 is pinned to yoke fitting 75, along a transverse horizontal axis. Yoke fitting 75 is attached to yoke 70, which is rigidly attached to slide valve members 61,62 at their left-hand ends. When bevel gears 71,72,73 are similar with equal pitch diameters, slide valve members 61,62 will continuously complete each reciprocating cycle in conjunction with each complete rotation of crankshaft 56.

Blower 76 continuously supplies pressurized combustion air into the crankcase of engine 49, via discharge conduit 77 and air inlet 68. Atmospheric air enters air filter 79 and suction conduit 78, before being pressurized by blower 76. Blower 76 may be driven from the crankshaft of engine 49 via a suitable gear train, pulley I and belt or chain link transmission.

Current practices in the design of new 2-stroke cycle engines may employ a reed-type valve in the air inlet means of the engine crankcases when atmospheric air is induced to flow into the crankcase Reed-type inlet valves are sensitive to small crankcase pressure changes, and are self-operating. During the compression stroke of an engine piston, a vacuum is produced on the under-side of the piston, and combustion air may be induced to flow into the crankcase by way of an open reed-type valve. During the descending power stroke of the engine piston, increased crankcase pressure causes combustion air to flow from the crankcase through an air supply conduit and into the piston chamber, by way of an open cylinder port which has been uncovered by the sidewall of the piston near its bottom dead-center cyclic position.

The multi-cylinder engine embodiments of FIGS. 1-2 inclusive and FIGS. 6-7 inclusive may employ a blower to supply pressurized combustion air into the engine crankcase, as at 45 in FIG. 1 and at 76 in FIG. 6. In the multi-cylinder engine embodiments of FIGS. 1 and 2, combustion air from the crankcase must pass through inlet ports 31a of reciprocating multi-port slide valve members 23,24 before entering a piston chamber. In the multi-cylinder engine embodiments of FIGS. 6 and 7, combustion air from the crankcase must enter a piston chamber through cylinder ports 65, which are uncovered by the sidewall of a piston 52 near its bottom dead-center cyclic position. Inlet cylinder ports 65 in the embodiments of FIGS. 6-7 inclusive may be larger and more numerous than inlet ports 31a of reciprocating multi-port slide valve members 23,24 (see also FIG. 5).

In the embodiments of FIGS. 1 and 2, use of a blower 45 to supply pressurized combustion air into the crankcase is preferred, because a combustion air charge entering each piston chamber must pass through opposite inlet ports 31a of slide valve members 23,24. In the engine embodiments of FIGS. 6 and 7, use of a blower to supply pressurized combustion air is optional. Where supercharging (air supply into piston chambers at pressures substantially above atmospheric) is desired, use of a blower 76 in the engine embodiments of FIGS. 6 and 7 is required. The engine embodiments of FIGS. 6-7 inclusive can also be developed without superchargings when a simple reed-type valve may be disposed adjacent air inlet 68 and piston action is used to induce atmospheric air flow into the engine crankcase.

In FIGS. 1-2, it should be noted that opposite cylinder ports 27 are located above piston 14 at its bottom dead-center cyclic position, while opposite cylinder outlet ports 28 are located adjacent the cylinder head at the piston's top dead-center cyclic position. In FIGS. 6-7, opposite cylinder ports 65 are located above piston 52 at its bottom dead-center cyclic position, while opposite cylinder outlet ports 66 are located adjacent the cylinder head at the piston's top dead-center cyclic position. These arrangements permit an improved scavenging flow of spent combustion gases from the piston chamber by an entering combustion air charge.

FIGS. 9-10 depict a bottom dead-center sectional elevation through one piston chamber of multi-cylinder 2-stroke engine 80 (FIG. 9). and a top dead-center sectional elevation through the same piston chamber of engine 80 (FIG. 10), The construction and operation of 2-stroke engine 80 is relatedly similar to the 2-stroke engines of FIGS. 1-2 and 6-7, with variations in methods of supplying combustion air into the piston chambers and the scavenging of spent combustion gases therefrom.

In FIG. 9, 2-stroke engine 80 receives pressurized combustion air into its piston chamber from opposite air manifolds 81,82 by way of ports of opposite reciprocating slide valves 83,84 and opposite upper cylinder ports adjacent the cylinder head. Spent combustion gases are shown as being scavenged with excess air from the piston chamber into the engine crankcase via opposite lower cylinder ports uncovered by the piston, and the scavenged combustion gases are discharged from engine 80 via crankcase outlets 85. Exhaust conduits of engine 80 downstream adjacent crankcase outlets 85 may require flow regulating devices therein, to limit any avoidable increases of engine pumpwork due to backpressures in a common engine crankcase. Multiport reciprocating slide valves 83,84 may be similar to slide valves 61,62 of FIGS. 6-7, and be operated from the engine crankshaft by the drive train described in connection with the embodiment of FIG. 8.

In FIG. 10, passageways communicating between opposite air supply manifolds 81,82 and opposite upper cylinder ports adjacent the cylinder head have been closed by reciprocating slide valves 83,84 and the opposite lower cylinder ports have been covered by the piston in the top dead-center position. The compressed piston chamber includes a mixture of high-pressure combustion air and fuel, which is at or imminent near ignition. Ignition of the compressed air-fuel mixture in the piston chamber may be either actuated by an electric spark from the spark plug, or by the increased temperatures due to compression when engine 80 operates as a diesel engine.

The preferred variation of the engine is disclosed in the illustrative embodiments of FIGS. 11-14 inclusive. The embodiment of FIG. 11 depicts a bottom dead-center sectional elevation through one piston chamber of multi-cylinder 2-stroke cycle engine 86. FIG. 12 depicts a fragmentary top dead-center sectional elevation through the same piston chamber of engine 86 shown in FIG. 11. FIG. 13 is an interior side elevation of air preheating manifold 87, which is also shown in FIGS. 11-12. FIG. 14 is an isometric schematic diagram showing pressurized air supply into opposite air preheating manifolds 87,88 of 2-stroke engine 86, and the discharge of cooled engine exhaust gases through electrostatic converter 105. The construction and operation of 2-stroke engine 86 is relatedly similar to the 2-stroke engines shown in FIGS. 1-2, 6-7 and 9-10, with variations in methods of supplying pressurized combustion air into the piston chambers and the scavenging of spent combustion gases therefrom. Opposite reciprocating slide valves 93,94 are similar to slide valves 23,24 of FIGS. 1-2, and may be operated from the engine crankshaft by the drive train described in connection with the embodiment of FIG. 5.

In FIG. 11, the extended piston chambers of multi-cylinder engine 86 receive pressurized combustion air from supply passageways 89,90 of opposite air preheating manifolds 87,88 by way of opposite upper cylinder ports adjacent the cylinder head and similar upper ports of opposite reciprocating slide valves 93,94. Scavenging flow of spent combustion gases with excess air is discharged from the piston chambers through opposite lower cylinder ports uncovered by the piston into exhaust passageways 91,92 of opposite air preheating manifolds 87,88 by way of similar lower ports of opposite reciprocating slide valves 93,94.

In FIG. 12, passageways communicating between air supply passageways 89,90 of opposite air preheating manifolds 87,88 and opposite cylinder ports adjacent the cylinder head have been closed by reciprocating slide valves 93,94 and the opposite lower cylinder ports have been covered by the piston in the top dead-center position. The compressed piston chamber contains a mixture of high-pressure combustion air and fuel, which is at or imminently near ignition. Ignition of the compressed air-fuel mixture in the piston chamber may be either actuated by an electric spark from the spark plug, or by the increased temperatures due to compression when engine 86 operates as a diesel engine.

FIG. 13 depicts a fragmentary interior side elevation of lefthand air preheating manifold 87, with pressurized combustion air entering interior supply passageway 89 from air inlet 95 and cooled engine exhaust gases flowing from interior exhaust passageway 91 through discharge outlet 96. Pressurized combustion air flows from interior supply passageway 89 through linear outlet slot 97, into an extended piston chamber of 2-stroke engine 86 by way of a corresponding upper port of reciprocating slide valve 93, Scavenging flow of spent combustion gases with excess air is discharged from an extended piston chamber into interior exhaust passageway 91 of left-hand air preheating manifold 87 by way of the lower left-hand cylinder port, the corresponding lower port of reciprocating slide valve 93, and linear inlet slot 98 of air preheating manifold 87, Air preheating manifolds 87,88 are machined cast-iron constructions which contain interior air supply passageways 89,90 and engine exhaust gas passageways 91,92. Air preheating manifolds 87,88 are heated by hot engine exhaust gases during operation of multi-cylinder engine 86. Heat energy supplied to manifolds 87,88 in exhaust passageways 91,92 is transferred to incoming combustion air in supply passageways 89,90 by both conduction and forced convection. Directional flows of air supply and exhaust gas streams with respect to each other within corresponding passageways 89,90 and 91,92 may be either co-current or countercurrent, depending on choices made by engine designers.

FIG. 14 illustrates flows of pressurized combustion air into opposite air preheating manifolds 87,88 of 2-stroke engine 86, and the discharge of scavenged combustion gases from the opposite air preheating manifolds. Air supply blower 99 receives atmospheric air from filtered inlet 100 and discharges pressurized combustion air into inlets of opposite air preheating manifolds 87,88 via conduit 101 and conduit branches 102. Scavenged combustion gases are discharged from outlets of opposite air preheating manifolds 87,88 into exhaust conduit branches 103 and exhaust conduit 104. The engine exhaust gases are discharged through electrostatic converter 105 and into exhaust conduit 106, from conduit 104. In electrostatic converter 105, gaseous pollutants such as carbon monoxide, nitrogen oxide and hydrocarbon vapors are transformed into relatively innocuous gaseous byproducts before atmospheric discharge.

Electrostatic converter 105 is an element of my presently pending application Ser. No, 633,,039 entitled "Electrostatic Redox Emission Control System For Internal Combustion Engines". filed Dec. 21, 1990, abandoned.

Further development of the preferred variation of the invention as disclosed in the embodiments of FIGS. 11-14 inclusive would lead to production of more fuel efficient, compact, superchargeable 2-stroke cycle engines of simplified design.

While I have disclosed and described certain specific embodiments of the present reciprocating 2-stroke cycle internal combustion engine invention, it will be readily understood by those skilled In the arts that I do not wish to be limited exactly thereto, since various modifications may be made to the disclosures without departing from the scope of the invention as defined in the appended claims.

I claim:

1. A reciprocating 2-stroke cycle multi-cylinder internal combustion engine having an engine block housing a plurality of piston chambers, each said piston chamber having a reciprocating piston disposed therewithin to compress and expand gaseous fluids, a rotary crankshaft having a plurality of crankpins disposed in a crankcase portion of said engine block on the low-pressure side of each said reciprocating piston, a plurality of connecting rods having members which are each pivotally connected at one end onto a said crank pin of said crankshaft and pivotally connected at its other end onto the corresponding said wrist pin of each individual said piston, a cylinder head closing the said plurality of piston chambers on the high-pressure portion of said engine block, a cover closing said crankcase portion of said engine block, means for intermittently supplying a combustible fuel into each said piston chamber, and means for intermittently igniting a compressed air-fuel mixture within each said piston chamber when its corresponding said piston is near its top dead-center cyclic position, comprising in combination:

air inlet means disposed in said crankcase portion of said engine block, to admit pressurized combustion air thereinto;

a fluid pump disposed to supply pressurized combustion air through communicating conduit means into said air inlet means of said crankcase;

each member of said plurality of piston chambers having a pair of opposite inlet ports disposed therein to admit pressurized combustion air thereinto, and a pair of opposite outlet ports disposed therein to discharge spent combustion gases therefrom;

a plurality of air supply conduits having members communicating between said pressurized crankcase and corresponding said opposite inlet ports of each said piston chamber, for intermittent passage of pressurized combustion air thereinto;

a plurality of combustion gas discharge conduits having members communicating between exterior exhaust conduit means and corresponding said opposite outlet ports of each said piston chamber, for intermittent discharge of spent combustion gases therefrom;

a plurality of multi-port slide valve means having opposite members which are linked together and slideably disposed on opposite sides of each said piston chamber in guideway means of said engine block, and disposed therein to reciprocate together;

transmission means communicating between said crankshaft and means linking the slideable motion of members of said plurality of multi-port slide valve means and disposed to continuously convert rotary motion to reciprocating motion, so that members of said plurality of opposite multi-port slide valve means reciprocate together and complete each reciprocating cycle in conjunction with completion of the designed rotation of said crankshaft;

members of said plurality of reciprocating oppositely-disposed multi-port slide valve means being disposed across corresponding members of said plurality of air supply and combustion gas discharge conduits which communicate with corresponding said opposite inlet ports and opposite outlet ports of each member of said plurality of piston chambers, to intermittently open and close corresponding said members of said plurality of air supply and combustion gas discharge conduits during reciprocation of said plurality of opposite multi-port slide valve means; and members of said plurality of reciprocating oppositely-disposed multi-port slide valve means each having companion sets of inlet and outlet ports for passage of fluids therethrough and disposed therein so that corresponding said air supply conduits and corresponding said combustion gas discharge conduits servicing each said piston chamber are intermittently opened in sequence during reciprocation of said plurality of opposite multi-port slide valve means when each corresponding said piston is near its bottom dead-center cyclic position, to sequentially admit a fresh charge of pressurized combustion air into each said piston chamber from its said opposite inlet ports that displaces and impels the discharge of spent combustion gases through its said opposite outlet ports;

whereby each member of said plurality of piston chambers is sequentially purged of spent combustion gases by an admitted charge of pressurized combustion air from said crankcase while its corresponding said piston is near its bottom dead-center cyclic position, as corresponding said members of its plurality of air supply and combustion gas discharge conduits are intermittently opened through corresponding said inlet and outlet ports of members of said plurality of reciprocating opposite multi-port slide valve means, and corresponding members of said plurality of air supply and combustion gas discharge conduits servicing each said piston chamber are intermittently closed in sequence by members of said plurality of reciprocating opposite multi-port slide valve means during the compression stroke of each corresponding said piston.

2. The reciprocating 2-stroke cycle multi-cylinder internal combustion engine of claim 1 wherein a plurality of liquid fuel injectors is disposed in said cylinder head., each member of said plurality of liquid fuel injectors having its outlet exposed into a corresponding said member of said plurality of piston chambers, a fluid pump disposed to supply high-pressure liquid fuel through communicating conduit means into an inlet of each said fuel injector, valve means disposed in a fuel supply conduit branch serving each said fuel injector, and valve operating means disposed to intermittently open said valve means serving each said fuel injector and admit high-pressure liquid fuel into its corresponding said piston chamber, when its corresponding said piston approaching its top dead-center cyclic position.

3. The reciprocating 2-stroke cycle multi-cylinder internal combustion engine of claim 1 wherein a plurality of electrical spark plugs is disposed in said cylinder head, each member of said plurality of electrical spark plugs having its electrodes exposed into a corresponding member of said plurality of piston chambers, a source of high-voltage electrical current, electrical conductor means communicating between said source of high-voltage electrical current and a terminal of each said electrical spark plug, and electrical switch means disposed in a conductor branch communicating between said source of high-voltage electrical current and a terminal of each said electrical spark plug, to intermittently energize electrodes of each said electrical spark plug and ignite the compressed air-fuel mixture within each said piston chamber when its corresponding said piston is near its top dead-center cyclic position.

4. The reciprocating 2-stroke cycle multi-cylinder internal combustion engine of claim 1 wherein each said piston member closely approaches said cylinder head at its top dead-center cyclic position to substantially reduce the volume of its corresponding said piston chamber, and the heat of compression from work done on a combustion air charge by each said piston member elevates combustion air temperature above the fuel ignition temperature to spontaneously ignite a combustible fuel supplied into its corresponding said piston chamber, 5. The reciprocating 2-stroke cycle multi-cylinder internal combustion engine of claim 1 wherein members of a pair of opposite exterior exhaust manifolds are individually disposed to communicate with corresponding members of said plurality of combustion gas discharge conduits which serve said outlet ports of said plurality of piston chambers on each side of said engine block, and said pair of opposite exterior exhaust manifolds collect the combined exhaust of spent combustion gases discharged from outlet ports of said plurality of piston chambers.

6. A reciprocating 2-stroke cycle multi-cylinder internal combustion engine having an engine block housing a plurality of piston chambers, each said piston chamber having a reciprocating piston disposed therewithin to compress or expand gaseous fluids a rotary crankshaft having a plurality of crank pins disposed in a crankcase portion of said engine block on the low-pressure side of said plurality of piston chambers, a plurality of wrist pins having members individually disposed onto the low-pressure side of each said reciprocating piston, a plurality of connecting rods having members which are each pivotally connected at one end onto a said crank pin of said crankshaft and pivotally connected at its other end onto the corresponding said wrist pin of its individual piston, each said connecting rod disposed to transmit a variable torque to said crankshaft during reciprocation of its corresponding said piston, a cylinder head closing said plurality of piston chambers on the high-pressure portion of said engine block, a cover closing said crankcase portion of said engine block, means for intermittently supplying a combustible fuel into each said piston chamber, and means for intermittently igniting a compressed air-fuel mixture within each said piston chamber when its corresponding said piston is near its top dead-center cyclic position, comprising in combination:

air inlet means disposed in said crankcase portion of said engine block, for admission of combustion air thereinto;

each member of said plurality of piston chambers having a plurality of cylinder ports disposed in the sidewall thereof for intermittent admission of combustion air thereinto, and a pair of second cylinder ports oppositely disposed in the sidewall thereof adjacent said cylinder head for intermittent discharge of spent combustion gases therefrom;

the first said plurality of cylinder ports being disposed in the sidewall of each said piston chamber so as to be substantially uncovered by the sidewall of its corresponding said piston near the bottom dead-center position of its power strokes and substantially closed by the sidewall of its corresponding said piston during its compression stroke;

a plurality of air supply conduits communicating between said crankcase and members of said plurality of first said cylinder ports of each said piston chamber;

a plurality of combustion gas discharge conduits communicating between said pair of oppositely-disposed second cylinder ports of each said piston chamber and exterior exhaust conduit means;

a pair of multi-port slide valve means having opposite members which are linked together and slideably disposed on opposite sides of each said piston chamber in guideway means of said engine block, and disposed therein to reciprocate together;

transmission means communicating between said crankshaft and means linking members of said pair of multi-port slide valve means and disposed to continuously convert rotary motion to reciprocating motion, so that members of said pair of oppositely-disposed multi-port slide valve means reciprocate together and continuously complete each reciprocating cycle in conjunction with completion of the designed rotation of said crankshaft;

members of said pair of reciprocating multi-port slide valve means being disposed across corresponding members of said plurality of combustion gas discharge conduits which communicate with corresponding members of said pair of oppositely-disposed second cylinder ports of each member of said plurality of piston chambers, to intermittently open and close corresponding members of said plurality of combustion gas discharge conduits serving each said piston chamber during reciprocation of said pair of oppositely-disposed multi-port slide valve means; and members of said pair of reciprocating oppositely-disposed multiport slide valve means having companion sets of outlet ports for passage of fluids therethrough and disposed therein so that corresponding said combustion gas discharge conduits servicing each said piston chamber are intermittently opened in sequence during reciprocation of said pair of oppositely-disposed multi-port slide valve means when each corresponding said piston is near its bottom dead-center cyclic position, and spent combustion gases are sequentially discharged from each said piston chamber;

whereby each member of said plurality of piston chambers is sequentially purged of spent combustion gases by a charge of fresh combustion air admitted thereinto from said crankcase while its corresponding said piston is near its bottom dead-center cyclic position, as corresponding members of said plurality of combustion gas discharge conduits are opened through corresponding said outlet ports of said pair of reciprocating multi-port slide valve means, and corresponding said members of said plurality of combustion gas discharge conduits servicing each said piston chamber are intermittently closed in sequence by members of said pair of reciprocating multi-port slide valve means during the compression stroke of each said piston.

7. The reciprocating 2-stroke cycle multi-cylinder internal combustion engine of claim 6 wherein a fluid pump is disposed to supply pressurized combustion air through communicating conduit means into said air inlet means of said crankcase.

8. The reciprocating 2-stroke cycle multi-cylinder internal combustion engine of claim 6 wherein a plurality of liquid fuel injectors is disposed in said cylinder head, each member of said plurality of liquid fuel injectors having its outlet exposed into a corresponding member of said plurality of piston chambers, a fluid pump disposed to supply high-pressure liquid fuel through communicating conduit means into an inlet of each said fuel injector, valve means disposed in a fuel supply conduit branch serving each said fuel injector, and valve operating means disposed to intermittently open each said valve means serving each said fuel injector and discharge high-pressure liquid fuel into its corresponding said piston chamber, as its corresponding said piston approaches its top dead-center cyclic position.

9. The reciprocating 2-stroke cycle multi-cylinder internal combustion engine of claim 6 wherein a plurality of electrical spark plugs is disposed in said cylinder head, each member of said plurality of electrical spark plugs having its electrode s exposed into a corresponding member of said plurality of piston chambers, a source of high-voltage electrical current, electrical conductor means communicating between said source of high-voltage electrical current and a terminal of each said electrical spark plug, and electrical switch means disposed in a conductor branch communicating between said source of high-voltage electrical current and a terminal of each said electrical spark plug, to intermittently energize electrodes of each said electrical spark plug and ignite the compressed air-fuel mixture within each said piston chamber when its corresponding said piston is near its top dead-center cyclic position.

10. The reciprocating 2-stroke cycle multi-cylinder internal combustion engine of claim 6 wherein each said piston member closely approaches said cylinder head at its top dead-center cyclic position to substantially reduce the volume of its corresponding said piston chamber, and the heat of compression from work done on a combustion air charge by each said piston member elevates combustion air temperature above the fuel ignition temperature to spontaneously ignite a combustible fuel supplied into its corresponding said piston chamber.

11. The reciprocating 2-stroke cycle multi-cylinder internal combustion engine of claim 6 wherein members of a pair of opposite exterior exhaust manifolds communicate with corresponding members of said plurality of combustion gas discharge conduits serving members of said pair of oppositely-disposed second cylinder ports on each side of said engine block, and said pair of opposite exterior exhaust manifolds collect the combined discharge of spent combustion gases from said second cylinder ports of said plurality of piston chambers.

12. A method for operating a reciprocating 2-stroke cycle internal combustion engine having an engine block housing a piston chamber with a reciprocating piston disposed therewithin to compress and expand gaseous fluids, a rotary crankshaft with crank pin disposed in a crankcase portion of said engine block on the low-pressure side of said piston, a wrist pin disposed onto the low-pressure side of said piston, a connecting rod having one end pivotally connected onto said wrist pin with its other end pivotally connected onto said crank pin and disposed to transmit a variable torque to said crankshaft during reciprocation of said piston, a cylinder head of said engine block closing the high-pressure portion of said piston chamber, a cover closing said crankcase portion of said engine block, air inlet means disposed in said crankcase portion of said engine block, check valve means disposed in said air inlet means of said crankcase, a plurality of air supply conduits communicating between said crankcase and a plurality of cylinder ports disposed in an extended portion of said piston chamber which are opened and closed by the sidewall of said piston during its reciprocation, a plurality of combustion gas discharge conduits communicating between a pair of opposite second cylinder ports of said piston chamber disposed adjacent said cylinder head and an atmospheric exhaust outlet, a linked pair of reciprocating ported slide valve members each having an outlet port for flow of fluids therethrough and slideably disposed opposite each other in guideway means of said engine block across said plurality of combustion gas discharge conduits to open and close said plurality of combustion gas discharge conduits during reciprocation of said linked pair of ported slide valve members, means for actuating the reciprocation of said linked pair of ported slide valve members, means for intermittently supplying a combustible fuel into said piston chamber, and means for intermittently igniting a compressed air-fuel mixture within said piston chamber when said piston is near its top dead-center cyclic position, said method comprising the combinative steps of:

inducing the flow of atmospheric combustion air into said crankcase by the vacuum produced by said reciprocating piston during its compression stroke;

pressurizing combustion air within said crankcase by said reciprocating piston during its extending power stroke;

flowing a charge of combustion air from said crankcase through said plurality of air supply conduits and into said piston chamber, when said plurality of first cylinder ports are uncovered by said piston near its bottom dead&-center cyclic position;

transforming rotary motion of said crankshaft to reciprocating motion of said linked pair of ported slide valve members in transmission means which communicate between said crankshaft and said linked pair of ported slide valve members;

synchronizing the reciprocation of said linked pair of ported slide valve members with rotation of said crankshaft, so that said linked pair of ported slide valve members continuously completes each reciprocating cycle in conjunction with completion of the designed rotation of said crankshaft;

discharging spent combustion gases from said piston chamber through said pair of opposite second cylinder ports and said plurality of combustion gas discharge conduits by way of said outlet ports of said linked pair of reciprocating ported slide valve members, when said piston is near its bottom dead-center cyclic position;

impelling the discharge of spent combustion gases from said piston chamber while said piston is near its bottom dead-center cyclic position, by admitting a charge of combustion air thereinto which displaces and expels spent combustion gases therefrom;

stopping the discharge of gaseous fluids from said piston chamber during the compression stroke of said piston, when said linked pair of ported slide valve members closes said plurality of combustion gas discharge conduits;

injecting a dispersed liquid fuel into said piston chamber, as said piston approaches its top dead-center cyclic position, and igniting the compressed air-fuel mixture within said piston chamber by an electric spark, as said piston approaches its top dead-center cyclic position.

13. The method of claim 12 wherein the said piston closely approaches said cylinder head at its top dead-center cyclic position to substantially reduce the volume of said piston chamber during its compression stroke, said engine having no spark-ignition means, with the additional steps of:

compressing the combustion air charge supplied into said piston chamber until the air temperature substantially exceeds the ignition temperature of a liquid fuel;

injecting the liquid fuel as a dispersed aerosol into the heated air charge within said piston chamber, as said piston approaches its top dead-center cyclic position; and spontaneously igniting the compressed air-fuel mixture within said piston chamber, as the dispersed liquid fuel aerosol contacts the heated combustion air charge therewithin.

14. A method for operating a reciprocating 2-stroke cycle internal combustion engine having an engine block housing a piston chamber with a reciprocating piston disposed therewithin to compress and expand gaseous fluids, a rotary crank shaft with crank pin disposed in a crankcase portion of said engine block on the low-pressure side of said piston, a wrist pin disposed onto the low-pressure side of said piston, a connecting rod having one end pivotally connected onto said wrist pin with its other end pivotally connected onto said crank pin and disposed to transmit a variable torque to said crankshaft during reciprocation of said piston, a cylinder head of said engine block closing the high-pressure portion of said piston chamber, a cover closing said crankcase portion of said engine block, air inlet means disposed in said crankcase portion of said engine block, a plurality of air supply conduits communicating between a pair of opposite cylinder ports disposed in an extended portion of said piston chamber, a fluid pump disposed to supply pressurized combustion air through communicating conduit means into said air inlet means of said crankcase, a plurality of combustion gas discharge conduits communicating between a pair of opposite second cylinder ports of said piston chamber disposed adjacent said cylinder head and an atmospheric exhaust outlet, a linked pair of reciprocating multi-port slide valve members each having inlet and outlet ports for flow of fluids therethrough and slideably disposed opposite each other in guideway means of said engine block across members of said pluralities of air supply and combustion gas discharge conduits to open and close said pluralities of air supply and combustion gas discharge conduits during reciprocation of said linked pair of multi-port slide valve members, means for actuating the reciprocation of said linked pair of multi-port slide valve members, means for intermittently supplying a combustible fuel into said piston chamber, and means for intermittently igniting a compressed air-fuel mixture within said piston chamber when said piston is near its top dead-center cyclic position, said method comprising the combinative steps of:

supplying pressurized combustion air into said air inlet means of said crankcase from the discharge of said fluid pump;

transforming rotary motion of said crankshaft to reciprocating motion of said linked pair of multi-port slide valve members in transmission means which communicates between said crankshaft and means linking said pair of multi-port slide valve members;

synchronizing the reciprocation of said linked pair of multiport slide valve members with rotation of said crankshaft, so that said linked pair of multi-port slide valve members continuously completes each reciprocating cycle in conjunction with completion of the designed rotation of said crankshaft;

flowing a charge of pressurized combustion air from said crankcase through said plurality of air supply conduits and said pair of opposite first cylinder ports into said piston chamber by way of said inlet ports of said linked pair of reciprocating multiport slide valve members, while discharging spent combustion gases from said piston chamber through said pair of opposite second cylinder ports and said plurality of combustion gas discharge conduits by way of said outlet ports of said linked pair of reciprocating multi-port slide valve members, while said piston is near its bottom dead-center cyclic position;

impelling the discharge of spent combustion gases from said piston chamber while said piston is near its bottom dead-center cyclic position, by admitting a charge of combustion air thereinto which displaces and expels spent combustion gases therefrom;

stopping the flow of combustion air into said piston chamber and discharge of fluids therefrom during the compression stroke of said piston, when said linked pair of reciprocating multi-port slide valve members cyclically closes said pluralities of air supply and combustion gas discharge conduits;

injecting a dispersed liquid fuel into said piston chamber, as said piston approaches its top dead-center cyclic position; and igniting the compressed air-fuel mixture within said piston chamber by an electric spark, as said piston is near its top dead-center cyclic position.

15. The method of claim 14 wherein the said piston closely approaches said cylinder head at its top dead-center cyclic position to substantially reduce the volume of said piston chamber during its compression stroke, said engine having no spark ignition means, with the additional steps of:

compressing the combustion air charge supplied into said piston chamber until the air temperature substantially exceeds the ignition temperature of a liquid fuel;

injecting the liquid fuel as a dispersed aerosol into the heated air charge within said piston chamber, as said piston approaches its top dead-center cyclic position; and spontaneously igniting the compressed air-fuel mixture within said piston chamber, as the dispersed liquid fuel aerosol contacts the heated combustion air charge therewithin.

16. A method for operating a reciprocating 2-stroke cycle multi-cylinder internal combustion engine having an engine block housing a plurality of piston chambers each with a reciprocating piston disposed therewithin to compress and expand gaseous fluids, a rotary crankshaft with a plurality of crank pins disposed in a crankcase portion of said engine block on the low-pressure side of said plurality of piston chambers, a wrist pin disposed onto the low-pressure side of each said piston, a plurality of connecting rods each having one end pivotally connected onto a said wrist pin with the other end pivotally connected onto a corresponding said crank pin, each said connecting rod disposed to transmit a variable torque to said crankshaft during reciprocation of its corresponding said piston, a cylinder head of said engine block closing the high-pressure portion of said plurality of piston chambers, a cover closing said crankcase portion of said engine block, air inlet means disposed in said crankcase portion of said engine block, check valve means disposed in said air inlet means of said crankcase, a plurality of air supply conduits communicating between said crankcase and a plurality of cylinder ports disposed in an extended portion of each said piston chamber, said plurality of cylinder ports serving each said piston chamber being opened and closed by the sidewall of its corresponding said piston near its bottom dead-center cyclic position, a plurality of combustion gas discharge conduits communicating between an atmospheric exhaust outlet and a pair of opposite second cylinder ports of each said piston chamber which are each disposed adjacent said cylinder head, a linked pair of reciprocating multi-port slide valve members each having a plurality of outlet ports disposed therein for flow of gaseous fluids therethrough and slideably disposed opposite each other in guideway means of said engine block across said plurality of combustion gas discharge conduits to sequentially open and close members of said plurality of combustion gas discharge conduits serving each said piston chamber during reciprocation of said linked pair of multi-port slide valve members in accordance with the designed firing order of said engine, means for actuating the reciprocation of said linked pair of multi-port slide valve members, means for intermittently supplying a combustible fuel into each said piston chamber, and means for intermittently igniting a compressed air-fuel mixture within each said piston chamber when its corresponding said piston is near its top dead-center cyclic position, said method comprising the combinative steps of:

inducing the flow of atmospheric combustion air into said crankcase by the vacuum produced by said plurality of reciprocating pistons during their compression strokes;

pressurizing combustion air within said crankcase by said plurality of reciprocating pistons during their extending power strokes;

flowing a charge of combustion air from said crankcase through said plurality of air supply conduits and into each said piston chamber, when its said plurality of first cylinder ports are uncovered by its corresponding said piston near its bottom dead-center cyclic position;

transforming rotary motion of said crankshaft to reciprocating motion of said linked pair of multi-port slide valve members in transmission means which communicate between said crankshaft and means linking said pair of multi-port slide valve members;

synchronizing the reciprocation of said linked pair of multi-port slide valve members with the rotation of said crankshaft, so that said linked pair of multi-port slide valve members continuously completes each reciprocating cycle in conjunction with completion of the designed rotation of said crankshaft;

discharging spent combustion gases from each said piston chamber through its said pair of opposite second cylinder ports and corresponding members of said plurality of combustion gas discharge conduits by way of corresponding said outlet ports of said linked pair of multi-port slide valve members, while its corresponding said piston is near its bottom dead-center cyclic position;

impelling the discharge of spent combustion gases from each said piston chamber while its corresponding said piston is near its bottom dead-center cyclic position, by admitting a charge of combustion air thereinto which displaces and expels spent combustion gases therefrom;

stopping the discharge of gaseous fluids from each said piston chamber during the compression stroke of its corresponding said piston, when said linked pair of reciprocating multi-port slide valve members closes corresponding members of said plurality of combustion gas discharge conduits;

injecting a dispersed liquid fuel into each said piston chamber, as its corresponding said piston approaches its top dead-center cyclic position; and igniting the compressed air-fuel mixture within each said piston chamber by an electric spark, when its corresponding said piston is near its top dead-center cyclic position.

17. The method of claim 16 wherein each said piston closely approaches said cylinder head at its top dead-center cyclic position to substantially reduce the volume of its said piston chamber during its compression stroke, said engine having no spark ignition means, with the additional steps of:

compressing the combustion air charge supplied into each said piston chamber until the air temperature substantially exceeds the ignition temperature of a liquid fuel;

injecting the liquid fuel as a dispersed aerosol into the heated air charge within each said piston chamber, as its corresponding said piston approaches its top dead-center cyclic position; and spontaneously igniting the compressed air-fuel mixture within each said piston chamber, as the dispersed liquid fuel aerosol contacts the heated combustion air charge therewithin.

18. A method for operating a reciprocating 2-stroke cycle multi-cylinder internal combustion engine having an engine block housing a plurality of piston chambers each with a reciprocating piston disposed therewithin to compress and expand gaseous fluids, a rotary crankshaft with a plurality of crank pins disposed in a crankcase portion of said engine block on the low-pressure side of said plurality of piston chambers, a wrist pin disposed onto the low-pressure side of each said piston, a plurality of connecting rods each having one end pivotally connected onto a said wrist pin with the other end pivotally connected onto a corresponding said crank pin, each said connecting rod disposed to transmit a variable torque to said crankshaft during reciprocation of its corresponding said piston, a cylinder head of said engine block closing the high-pressure portion of said plurality of piston chambers, a cover closing the crankcase portion of said engine block, air inlet means disposed in said crankcase portion of said engine block, a fluid pump disposed to supply pressurized combustion air through communicating conduit means into said air inlet means of said crankcase, a plurality of air supply conduits communicating between said crankcase and a pair of opposite cylinder ports in each said piston chamber, a plurality of combustion gas discharge conduits communicating between an atmospheric exhaust outlet and a pair of opposite second cylinder ports of each said piston chamber which are each disposed adjacent said cylinder head, a linked pair of reciprocating multi-port slide valve members each having a plurality of inlet and outlet ports disposed therein for flow of gaseous fluids therethrough and slideably disposed opposite each other in guideway means of said engine block across said pluralities of air supply and combustion gas discharge conduits to sequentially open and close members of said pluralities of air supply and combustion gas discharge conduits serving each said piston chamber during reciprocation of said linked pair of multi-port slide valve members in accordance with the designed firing order of said engine, means for actuating the reciprocation of said linked pair of multi-port slide valve members, means for intermittently supplying a combustible fuel into each said piston chamber, and means for intermittently igniting a compressed air-fuel mixture within each said piston chamber when its corresponding said piston is near its top dead-center cyclic position, said method comprising the combinative steps of:

supplying pressurized combustion air into said air inlet means of said crankcase from the discharge of said fluid pump;

transforming rotary motion of said crankshaft to reciprocating motion of said linked pair of multi-port slide valve members in transmission means which communicate between said crankshaft and means linking said pair of multi-port slide valve members;

synchronizing the reciprocation of said linked pair of multi-port slide valve members with rotation of said crankshaft, so that said linked pair of multi-port slide valve members continuously completes each reciprocating cycle in conjunction with completion of the designed rotation of said crankshaft;

sequentially flowing a charge of pressurized combustion air from said crankcase into each said piston chamber through corresponding members of said plurality of air supply conduits by way of said inlet ports of said linked pair of reciprocating multi-port slide valve members, while discharging spent combustion gases from the said piston chamber through corresponding members of said plurality of combustion gas discharge conduits by way of said outlet ports of said linked pair of reciprocating multi-port slide valve members, as corresponding members of said pluralities of air supply and combustion gas discharge conduits are opened through said inlet and outlet ports of said linked pair of reciprocating multi-port slide valve members while the corresponding said piston is near its bottom dead-center cyclic position;

impelling the discharge of spent combustion gases from each said piston chamber while its corresponding said piston is near its bottom dead-center cyclic position, by admitting pressurized combustion air into the piston chamber which displaces and expels spent combustion gases therefrom;

stopping the flow of pressurized combustion air into each said piston chamber and the discharge of gaseous fluids therefrom during the compression stroke of its corresponding said piston, when the said linked pair of reciprocating multi-port slide valve members cyclically close corresponding members of said pluralities of air supply and combustion gas discharge conduits serving the said piston chamber;

injecting a dispersed liquid fuel into each said piston chamber, as its corresponding said piston approaches its top dead-center cyclic position; and igniting the compressed air-fuel mixture within each said piston chamber by an electric spark, as its corresponding said piston is near its top dead-center cyclic position.

19. The method of claim 18 wherein each said piston closely approaches said cylinder head at its top dead-center cyclic position to substantially reduce the volume of its said piston chamber during its compression stroke, said engine having no spark ignition means, with the additional steps of:

compressing the combustion air charge supplied into each said piston chamber until the air temperature substantially exceeds the ignition temperature of a liquid fuel;

injecting the liquid fuel as a dispersed aerosol into the heated air charge within each said piston chamber, as its corresponding said pistons approaches its top dead-center cyclic position; and spontaneously igniting the compressed air-fuel mixture within each said piston chamber, as the dispersed liquid fuel aerosol contacts the heated combustion air charge therewithin.

20. A reciprocating multi-cylinder internal combustion engine having an engine block housing a plurality of piston chambers, each said piston chamber having a reciprocating piston disposed therewithin to compress and expand gaseous fluids, a rotary crankshaft having a plurality of crank pins and disposed in a crankcase portion of said engine block on the low-pressure side of said plurality of piston chambers, a plurality of wrist pins having members individually disposed onto the low-pressure side of each member of said plurality of reciprocating pistons, a plurality of connecting rods each having one end pivotally connected onto a said wrist pin with the other end pivotally connected onto a corresponding said crank pin, each said connecting rod disposed to transmit a variable torque to said crankshaft during reciprocation of its corresponding said piston, a cylinder head of said engine block closing the high-pressure portion of said plurality of piston chambers, a cover closing said crankcase portion of said engine block, a plurality of air supply conduits each communicating between a source of combustion air and a plurality of inlet cylinder ports of each member of said plurality of piston chambers, a plurality of combustion gas discharge conduits each communicating between an atmospheric exhaust outlet and a plurality of outlet cylinder ports of each member of said plurality of piston chambers, means for intermittently supplying a combustible fuel into each said piston chamber, and means for intermittently igniting a compressed air-fuel mixture within each said piston chamber when its corresponding said piston is near its top dead-center cyclic positions comprising in combination:

said plurality of inlet cylinder ports of each said piston chamber being individually disposed in the sidewall of said piston chamber so as to be substantially uncovered by the sidewall of its corresponding said piston near its bottom dead-center cyclic position and substantially covered by the sidewall of said piston during its compression stroke, and said plurality of outlet cylinder ports being individually disposed in the sidewall of each said piston chamber adjacent said cylinder head;

a pair of multi-port slide valve members having opposite members which are linked together and slideably disposed on opposite sides of each said piston chamber in guideway means of said engine block, and disposed therein to reciprocate together;

transmission means communicating between said crankshaft and means linking the members of said pair of multi-port slide valve members and disposed to continuously convert rotary motion to reciprocating motion, so that members of said pair of oppositely-disposed multi-port slide valve members reciprocate together and continuously complete each reciprocating cycle in conjunction with completion of a designed rotation of said crankshaft;

members of said pair of reciprocating multi-port slide valve members being disposed across corresponding members of said plurality of combustion gas discharge conduits which communicate with corresponding members of said plurality of outlet cylinder ports of each member of said plurality of piston chambers, to intermittently open and close corresponding members of said plurality of combustion gas discharge conduits serving each said piston chamber during reciprocation of said pair of opposite multiport slide valve members; and members of said pair of reciprocating opposite multi-port slide valve members having companion sets of outlet ports for passage of fluids therethrough and disposed therein so that corresponding said combustion gas discharge conduits serving each said piston chamber are intermittently opened in sequence during reciprocation of said pair of opposite multi-port slide valve members when each corresponding said piston is near its bottom dead-center cyclic position, and spent combustion gases are sequentially discharged from each said piston chamber;

whereby each member of said plurality of piston chambers is sequentially purged of spent combustion gases by a charge of fresh combustion air while its corresponding said piston is near its bottom dead-center cyclic position, as corresponding members of said plurality of combustion gas discharge conduits are opened through corresponding said outlet ports of said reciprocating pair of opposite multi-port slide valve members, and corresponding said members of said plurality of combustion gas discharge conduits serving each said piston chamber are intermittently closed in sequence by members of said pair of reciprocating multi-port slide valve members during the compression stroke of each corresponding said piston.

21. The reciprocating multi-cylinder internal combustion engine of claim 20 wherein a plurality of liquid fuel injectors is disposed in said cylinder head, each member of said plurality of liquid fuel injectors having its outlet exposed into a corresponding member of said plurality of piston chambers, a fluid pump is disposed to supply high-pressure liquid fuel through communicating conduit means into an inlet of each said fuel injector,, valve means@are disposed in a fuel supply conduit branch serving each said fuel injector, and valve operating means is disposed to intermittently open each said valve means serving each said fuel injector and discharge high-pressure liquid fuel into its corresponding said piston chamber, when its corresponding said piston approaches its top dead-center cyclic position.

22. The reciprocating multi-cylinder internal combustion engine of claim 20 wherein a plurality of electrical spark plugs is disposed in said cylinder head, each member of said plurality of electrical spark plugs having its electrodes exposed into a corresponding member of said plurality of piston chambers, a source of high-voltage electrical current, electrical conductor means communicating between said source of high-voltage electrical current and a terminal of each said electrical spark plug, and electrical switch means disposed in a conductor branch communicating between said source of high-voltage electrical current and a terminal of each said electrical spark plug, to intermittently energize electrodes of each said electrical spark plug and ignite the compressed air-fuel mixture within each said piston chamber when its corresponding said piston is near its top dead-center cyclic position.

23. The reciprocating multi-cylinder internal combustion engine of claim 20 wherein each said piston member closely approaches said cylinder head at its top dead-center cyclic position to substantially reduce the volume of its corresponding said piston chamber, and the heat of compression from work done on a combustion air charge by each said piston member elevates combustion air temperature above the fuel ignition temperature to spontaneously ignite a combustible fuel supplied into its corresponding said piston chamber.

24. The reciprocating multi-cylinder internal combustion engine of claim 20 wherein members of a pair of opposite exterior exhaust manifolds are individually disposed to communicate with corresponding members of said plurality of combustion gas discharge conduits serving members of said plurality of outlet cylinder ports of each member of said plurality of piston chambers from opposite sides of said engine block, and said pair of opposite exterior exhaust manifolds collect the combined exhaust of spent combustion gases discharged from said outlet cylinder ports of said plurality of piston chambers.

25. A reciprocating multi-cylinder internal combustion engine having an engine block housing a plurality of piston chambers, each said piston chamber having a reciprocating piston disposed therewithin to compress and expand gaseous fluids, a rotary crankshaft having a plurality of crank pins and disposed in a crankcase portion of said engine block on the low-pressure side of said plurality of piston chambers, a plurality of wrist pins having members individually disposed onto the low-pressure side of each member of said plurality of reciprocating pistons, a plurality of connecting rods each having one end pivotally connected onto a said wrist pin with the other end pivotally connected onto a corresponding said crank pin, each said connecting rod disposed to transmit a variable torque to said crankshaft during reciprocation of its corresponding said piston, a cylinder head of said engine block closing the high-pressure portion of said plurality of piston chambers, a cover closing said crankcase portion of said engine block, a plurality of air supply conduits each communicating between a source of combustion air and a plurality of inlet cylinder ports of each member of said plurality of piston chambers, a plurality of combustion gas discharge conduits each communicating between an atmospheric exhaust outlet and a plurality of outlet cylinder ports of each member of said plurality of piston chambers, means for intermittently supplying a combustible fuel into each said piston chamber, and means for intermittently igniting a compressed air-fuel mixture within each said piston chamber when its corresponding said piston is near its top dead-center cyclic position, comprising in combination:

said plurality of inlet cylinder ports being individually disposed in the sidewall of each said piston chamber in a lower portion thereof, and said plurality of outlet cylinder ports being individually disposed in the sidewall of each said piston chamber adjacent said cylinder head;

a fluid pump disposed to supply pressurized combustion air through communicating conduit means into said plurality of air supply conduits serving each said piston chamber;

a pair of multi-port slide valve members having opposite members which are linked together and slideably disposed on opposite sides of each said piston chamber in guideway means of said engine block, and disposed therein to reciprocate together;

transmission means communicating between said crankshaft and means linking the members of said pair of multi-port slide valve members and disposed to continuously convert rotary motion to reciprocating motion, so that members of said pair of oppositely-disposed multi-port slide valve members reciprocate together and continuously complete each reciprocating cycle in conjunction with completion of a designed rotation of said crankshaft;

members of said linked pair of reciprocating multi-port slide valve members each having a plurality of inlet ports for flow of combustion air therethrough and a plurality of outlet ports for flow of combustion gases therethrough, and disposed across members of said pluralities of air supply and combustion gas discharge conduits serving each said piston chamber to intermittently open and close members of said pluralities of air supply and combustion gas discharge conduits during reciprocation of said linked pair of reciprocating multi-port slide valve members; and members of said pluralities of inlet and outlet ports of said members of the linked pair of reciprocating multi-port slide valve members being disposed in each said slide valve member in companion sets to sequentially open each member of said pluralities of air supply and combustion gas discharge conduits serving each said piston chamber, and supply a charge of pressurized combustion air into each said piston chamber while discharging spent combustion gases therefrom as its corresponding said piston is near its bottom dead-center cyclic position;

whereby a charge of combustion air is sequentially admitted through said plurality of inlet cylinder ports into each said piston chamber of said multi-cylinder engine while spent combustion gases are discharged through its said plurality of outlet cylinder ports, as corresponding members of said pluralities of air supply and combustion gas discharge conduits serving each said piston chamber are opened through said companion sets of inlet and outlet ports of said linked pair of reciprocating multi-port slide valve members and members of said pluralities of air supply and combustion gas discharge conduits serving each said piston chamber are substantially closed by said linked pair of reciprocating multi-port slide valve members during the compression stroke of the corresponding said piston.

26. The reciprocating multi-cylinder internal combustion engine of claim 25 wherein a plurality of liquid fuel injectors is disposed in said cylinder head, each member of said plurality of liquid fuel injectors having its outlet exposed into a corresponding member of said plurality of piston chambers, a fluid pump is disposed to supply high-pressure liquid fuel through communicating conduit means into an inlet of each said fuel injector, valve means are disposed in a fuel supply conduit branch serving each said fuel injector, and valve operating means is disposed to intermittently open each said valve means serving each said fuel injector and discharge high-pressure liquid fuel into its corresponding said piston chamber, when its corresponding said piston approaches its top dead-center cyclic position.

27. The reciprocating multi-cylinder internal combustion engine of claim 25 wherein a plurality of electrical spark plugs is disposed in said cylinder head, each member of said plurality of electrical spark plugs having its electrodes exposed into a corresponding member of said plurality of piston chambers, a source of high-voltage electrical current, electrical conductor means communicating between said source of high-voltage electrical current and a terminal of each said electrical spark plug, and electrical switch means disposed in a conductor branch communicating between said source of high-voltage electrical current and a terminal of each said electrical spark plug, to intermittently energize electrodes of each said electrical spark plug and ignite the compressed air-fuel mixture within each said piston chamber when its corresponding said piston is near its top dead-center cyclic position.

28. The reciprocating multi-cylinder internal combustion engine of claim 25 wherein each said piston member closely approaches said cylinder head at its top dead-center cyclic position to substantially reduce the volume of its corresponding said piston chamber, and the heat of compression from work done on a combustion air charge by each said piston member elevates combustion air temperature above the fuel ignition temperature to spontaneously ignite a combustible fuel supplied into its corresponding said piston chamber.

29. The reciprocating multi-cylinder internal combustion engine of claim 25 wherein air inlet means are disposed in said crankcase portion of said engine block, the said fluid pump is disposed to supply pressurized combustion air into said air inlet means of said crankcase, and members of said plurality of air supply conduits communicate with said crankcase.

30. A method for operating a reciprocating multi-cylinder internal combustion engine having an engine block housing a plurality of piston chambers each with a reciprocating piston disposed therewithin to compress and expand gaseous fluids, a rotary crankshaft having a plurality of crank pins and disposed in a crankcase portion of said engine block on the low-pressure side of said plurality of piston chambers, a wrist pin disposed on the low-pressure side of each said reciprocating piston, a plurality of connecting rods each having one end pivotally connected onto a said wrist pin with the other end pivotally connected onto a corresponding said crank pin, each said connecting rod disposed to transmit a variable torque to said crankshaft during reciprocation of its corresponding said piston, a cylinder head of said engine block closing the high-pressure portion of said plurality of piston chambers, a cover, closing said crankcase portion of said engine block, air inlet means disposed in said crankcase portion of said engine block, check valve means disposed in said air inlet means to admit atmospheric air into said crankcase, a plurality of air supply conduits communicating between said crankcase and a plurality of inlet cylinder ports disposed in an extended portion of each said piston chamber, said plurality of inlet cylinder ports serving each said piston chamber being opened and closed by the sidewall of its corresponding said piston near its bottom dead-center cyclic position, a plurality of combustion gas discharge conduits communicating between an atmospheric exhaust outlet and a plurality of outlet cylinder ports of each said piston chamber which are disposed adjacent said cylinder head, a linked pair of reciprocating multi-port slide valve members each having a plurality of outlet ports disposed therein for flow of gaseous fluids therethrough, members of said linked pair of said reciprocating slide valve members being slideably disposed in guideway means of said engine block on opposite sides of said plurality of piston chambers and disposed across members of said plurality of combustion gas discharge conduits to sequentially open and close members of said plurality of combustion gas discharge-conduits serving each said piston chamber during reciprocation of said linked pair of multi-port slide valve members in accordance with the designed firing order of said engine, means for actuating the reciprocation of said linked pair of multi-port slide valve members, means for intermittently supplying a combustible fuel into each said piston chamber, and means for intermittently igniting a compressed air-fuel mixture within each said piston chamber when its corresponding said piston is near its top dead-center cyclic position, said method comprising the combinative steps of:

inducing the flow of atmospheric combustion air into said crankcase by the vacuum produced by members of said plurality of reciprocating pistons during their compression strokes;

pressurizing combustion air within said crankcase by the pressure pulses produced by members of said plurality of reciprocating pistons during their expansion strokes;

flowing a charge of combustion air from said crankcase through members of said plurality of air supply conduits and into each said piston chamber, when its said plurality of inlet cylinder ports are uncovered by the sidewall of its corresponding said piston;

transforming rotary motion of said crankshaft to reciprocation of said linked pair of multi-port slide valve members in transmission means which communicate between said crankshaft and means linking said pair of multi-port slide valve members;

synchronizing the reciprocation of said linked pair of multiport slide valve members with rotation of said crankshaft, so that said linked pair of multi-port slide valve members continuously completes each reciprocating cycle in conjunction with completion of a designed rotation of said crankshaft;

discharging spent combustion gases from each said piston chamber through its said plurality of outlet cylinder ports and corresponding members of said plurality of combustion gas discharge conduits by way of corresponding said outlet ports of said linked pair of reciprocating multi-port slide valve members, when its corresponding said piston is near its bottom dead-center cyclic position;

impelling the discharge of spent combustion gases from each said piston chamber while its corresponding said piston is near its bottom dead-center cyclic position, by admitting a charge of combustion air thereinto which displaces and expels spent combustion gases therefrom;

stopping the discharge of gaseous fluids from each said piston chamber during the compression stroke of its corresponding said piston, when said linked pair of reciprocating multi-port slide valve members cyclically closes corresponding members of said plurality of combustion gas discharge conduits serving the corresponding said piston chamber;

intermittently injecting a dispersed liquid fuel into each said i piston chamber, during the compression stroke of its correspond-said piston; and intermittently igniting the compressed air-fuel mixture within each said piston chamber by an electric spark, as its corresponding said piston is near its top dead-center cyclic position.

31. The method of claim 30 wherein each said piston closely approaches said cylinder head at its top dead-center cyclic position to substantially reduce the volume of its said piston chamber during its compression stroke, said engine having no spark ignition means, with the additional steps of:

compressing the combustion air charge supplied into each said piston chamber until the air temperature substantially exceeds the ignition temperature of a liquid fuel;

injecting the liquid fuel as a dispersed aerosol into each said piston chamber during the compression stroke of its corresponding said piston; and spontaneously igniting the compressed air-fuel mixture within each said piston chamber, as the dispersed liquid fuel aerosol contacts the heated combustion air charge therewithin.

32. The method of claim 30 wherein the outlet of a fluid pump communicates with said ail, inlet means, and pressurized combustion air is supplied into said crankcase.

33. A method for operating a reciprocating multi-cylinder internal combustion engine having an engine block housing a plurality of piston chambers each with a reciprocating piston disposed therewithin to compress and expand gaseous fluids, a rotary crankshaft having a plurality of crank pins and disposed in a crankcase portion of said engine block on the low-pressure side of said plurality of piston chambers, a wrist pin disposed onto the low-pressure side of each said reciprocating piston, a plurality of connecting rods each having one end pivotally connected onto a said wrist pin with the other end pivotally connected onto a corresponding said crank pin, each said connecting rod disposed to transmit a variable torque to said crankshaft during reciprocation of its corresponding said piston, a cylinder head of said engine block closing the high-pressure portion of said plurality of piston chambers, a cover closing said crankcase portion of said engine block, air inlet means disposed in said crankcase portion of said engine block, a fluid pump disposed to supply pressurized combustion air through communicating conduit means into said air inlet means of said crankcase, a plurality of air supply conduits communicating between said crankcase and a plurality of inlet cylinder ports in each said piston chamber, a plurality of combustion gas discharge communicating between an atmospheric exhaust outlet and a plurality of outlet cylinder ports in each said piston chamber which are disposed adjacent said cylinder head, a linked pair of reciprocating multi-port slide valve members each having a plurality of companion inlet and outlet ports disposed therein for flow of gaseous fluids therethrough, members of said linked pair of reciprocating multi.-port slide valve members being slideably disposed in guideway means of said engine block on opposite sides of said plurality of piston chambers and disposed across members of said pluralities of air supply and combustion gas discharge conduits to sequentially open and close members of said pluralities of air supply and combustion gas discharge conduits serving each said piston chamber during reciprocation of said linked pair of multi-port slide valve members in accordance with the designed firing order of said engine, means for actuating the reciprocation of said linked pair of multi-port slide valve members, means for intermittently supplying a combustible fuel into each said piston chamber, and means for, intermittently igniting a compressed air-fuel mixture within each said piston chamber when its corresponding said piston is near its top dead-center cyclic position, said method comprising the combinative steps of:

transforming rotary motion of said crankshaft to reciprocating motion of said linked pair of multi-port slide valve members in transmission means which communicate between said crankshaft and means linking said pair of multi-port slide valve members;

synchronizing the reciprocation of said linked pair of multi-port slide valve members with rotation of said crankshaft, so that said linked pair of multi-port slide valve members continuously completes each reciprocating cycle in accordance with completion of a designed rotation of said crankshaft;

sequentially flowing a charge of pressurized combustion air from said crankcase into each said piston chamber through corresponding members of said plurality of air supply conduits by way of said inlet ports of said linked pair of reciprocating multi-port slide valve members, while discharging spent combustion gases from the said piston chamber through corresponding members of said plurality of combustion gas discharge conduits by way of said outlet ports of said linked pair of reciprocating multi-port slide valve members, as corresponding members of said pluralities of air supply and combustion gas discharge conduits are opened through said inlet and outlet ports of said linked pair of reciprocating multi-port slide valve members while the corresponding said piston is near its bottom dead-center cyclic position;

impelling the discharge of spent combustion gases from each said piston chamber while its corresponding said piston is near its bottom dead-center cyclic position,, by admitting pressurized combustion air into the piston chamber which displaces and expels spent combustion gases therefrom;

stopping the flow of pressurized combustion air into each said piston chamber and the discharge of gaseous fluids therefrom during the compression stroke of its corresponding said piston, when the said linked pair of reciprocating multi-port slide valve members cyclically close corresponding members of said pluralities of air supply and combustion gas discharge conduits serving the said piston chamber;

injecting a dispersed liquid fuel into each said piston chamber, during the compression stroke of its corresponding said piston; and igniting the compressed air-fuel mixture within each said piston chamber by an electric spark, as its corresponding said piston is near its top dead-center cyclic position.

34. The method of claim 33 wherein each said piston closely approaches said cylinder head at its top dead-center cyclic position to substantially reduce the volume of its said piston chamber during its compression stroke, said engine having no spark ignition, means, with the additional steps of:

compressing the combustion air charge supplied into each said piston chamber until the air temperature substantially exceeds the ignition temperature of a liquid fuel;

injecting the liquid fuel as a dispersed aerosol into each said piston chamber-during the compression stroke of its corresponding said piston; and spontaneously igniting the compressed air-fuel mixture within each said piston chamber, as the dispersed liquid fuel aerosol contacts the heated combustion air charge therewithin.

35. A reciprocating multi-cylinder internal combustion engine having an engine block housing a plurality of piston chambers, each said piston chamber closed by a cylinder head at its high-pressure end and having a reciprocating piston slideably disposed therein to compress and expand gaseous fluids, each reciprocating piston disposed to transmit an intermittent torque to a rotating output crankshaft of said engine, means for intermittently supplying combustion air, and a combustible fuel into each said piston chamber, means for intermittently igniting a compressed air-fuel mixture within each said piston chamber, and means for intermittently discharging spent combustion gases from each said piston chamber, comprising in combination:

a plurality of air inlet cylinder ports disposed adjacent said cylinder head in each said piston chamber, for passage of combustion air thereinto;

a plurality of gas outlet cylinder ports disposed in an extended portion of each said piston chamber opposite from said plurality of air inlet cylinder ports, for discharge of spent combustion gases therefrom;

a pair of exhaust manifolds each having inlet and outlet means, whose members are disposed on opposite sides of said engine block conduit means communicating between members of said plurality of air inlet cylinder ports of each said piston chamber and said air inlet means of said engine;

conduit means communicating between members of said plurality of gas outlet cylinder ports of each said piston chamber and said inlet means of each said exhaust manifold;

a pair of multi-port slide valve members having opposite members which are linked together and slideably disposed on opposite sides of each said piston chamber in guideway means of said engine block, and disposed therein to reciprocate together;

transmission means communicating between said crankshaft and means linking members of said pair of multi-port slide valve members and disposed to continuously convert rotary motion to reciprocating motion, so that members of said pair of oppositely-disposed multi-port slide valve members reciprocate together and continuously complete each reciprocating cycle in conjunction with completion of a designed rotation of said crankshaft;

members of said linked pair of reciprocating multi-port slide valve members each having a plurality of inlet ports for flow of combustion air therethrough and a plurality of outlet ports for flow of combustion gases therethrough, and disposed across corresponding members of said pluralities of air supply and combustion gas discharge conduits serving each said piston chamber from opposite sides thereof to intermittently open and close members of said pluralities of air supply and combustion gas discharge conduits during reciprocation of said linked pair of reciprocating multi-port slide valve members; and members of said pluralities of inlet and outlet ports of said members of the linked pair of reciprocating multi-port slide valve members being disposed in each said slide valve member in companion sets to sequentially open each member of said pluralities of air supply and combustion gas discharge conduits serving each said piston chamber from opposite sides thereof, and supply a charge of pressurized combustion air into each said piston chamber from opposite sides thereof while discharging spent combustion gases from each said piston chamber from opposite sides thereof as its corresponding said piston is near its bottom dead-center cyclic position;

whereby a charge of combustion air is sequentially admitted through members of said plurality of air inlet cylinder ports into each said piston chamber while spent combustion gases are discharged through members of said plurality of gas outlet cylinder ports from each said piston chamber, as corresponding members of said pluralities of air supply and combustion gas discharge conduits serving each said piston chamber from opposite sides thereof are opened through said companion sets of inlet and outlet ports of said linked pair of reciprocating multi-port slide valve members, and members of said pluralities of air supply and combustion gas discharge conduits serving each said piston chamber are sequentially closed by said linked pair of reciprocating multi-port slide valve members during the compression stroke of the corresponding said piston.

36. The reciprocating multi-cylinder internal combustion engine of claim 35 wherein members of the said plurality of gas outlet cylinder ports serving each said piston chamber are disposed adjacent said cylinder head, and members of said plurality of air inlet cylinder ports serving each said piston chamber are disposed in an extended portion thereof opposite from members of said plurality of gas outlet cylinder ports.

37. The reciprocating multi-cylinder internal combustion engine of claim 35 wherein a fluid pump is disposed to supply pressurized combustion air into said air inlet means of said engine.

38. The reciprocating multi-cylinder internal combustion engine of claim 35 wherein a plurality of liquid fuel injectors is disposed in said cylinder head, each member of said plurality of liquid fuel injectors having its outlet exposed into a corresponding member of said plurality of piston chambers, a fluid pump is disposed to supply high-pressure liquid fuel through communicating conduit means into an inlet of each said fuel injector, valve means are disposed in a fuel supply conduit branch serving each said fuel injector, and valve operating means is disposed to intermittently open each said valve means serving each said fuel injector and discharge high-pressure liquid fuel into its corresponding said piston chamber, when its corresponding said piston approaches its top dead-center cyclic position.

39. The reciprocating multi-cylinder internal combustion engine of claim 35 wherein a plurality of electrical spark plugs is disposed in said cylinder head, each member of said plurality of electrical spark plugs having its electrodes exposed into a corresponding member of said plurality of piston chambers, a source of high-voltage electrical current,, electrical conductor means communicating between said source of high-voltage electrical current and a terminal of each said electrical spark plug, and electrical switch means disposed in a conductor branch communicating between said source of high-voltage electrical current and a terminal of each said electrical spark plug, to intermittently energize electrodes of each said electrical spark plug and ignite the compressed air-fuel mixture within each said piston chamber when its corresponding said piston is near its top dead-center cyclic position.

40. The reciprocating multi-cylinder internal combustion engine of claim 35 wherein each said piston member closely approaches said cylinder head at its top dead-center cyclic position to substantially reduce the volume of its corresponding said piston chamber, and the heat of compression from work done on a combustion air charge by each said piston member elevates combustion air temperature above the fuel ignition temperature to spontaneously ignite a combustible fuel supplied into its corresponding said piston chamber.

41. The reciprocating multi-cylinder internal combustion engine of claim 35 wherein a fluid pump is disposed to supply pressurized combustion air through communicating conduit means into said air inlet means of said engine and members of said plurality of piston chambers.

42. A reciprocating multi-cylinder internal combustion engine having an engine block housing a plurality of piston chambers, each said piston chamber closed by a cylinder head at its high-pressure end and having a reciprocating piston slideably disposed therein to compress and expand gaseous fluids, each reciprocating piston disposed to transmit an intermittent torque to a rotating output crankshaft of said engine, means for intermittently supplying combustion air and a combustible fuel into each said piston chamber, means for intermittently igniting a compressed air-fuel mixture within each said piston chamber, and means for intermittently discharging spent combustion gases from each said piston chamber, comprising in combination:

a plurality of air inlet cylinder ports disposed adjacent said cylinder head in each said piston chamber, for passage of combustion air thereinto;

a plurality of gas outlet cylinder ports disposed in an extended portion of each said piston chamber opposite from said plurality of air inlet cylinder ports, for discharge of spent combustion gases therefrom;

a pair of air-preheating manifold heat exchangers whose members are disposed on opposite sides of said engine block, each said manifold heat exchanger having separated fluid passageways confining flow therethrough of combustion air supplied into each said piston chamber and combustion gases discharged from each said piston chamber, air inlet and outlet means, combustion gas inlet and outlet means, and being adapted to transfer heat there within between discharge flows of hot combustion gases and cooler incoming flows of combustion air;

conduit means communicating between members of said plurality of air inlet cylinder ports of each said piston chamber and said air outlet means of members of said pair of oppositely-disposed manifold heat exchangers;

conduit means communicating between members of said plurality of gas outlet cylinder ports of each said piston chamber and said gas inlet means of members of said pair of oppositely-disposed manifold heat exchangers;

members of said pair of manifold heat exchangers disposed to supply preheated combustion air into said conduit air supply means communicating with members of said plurality of air inlet cylinder ports of said plurality of piston chambers from opposite sides thereof, and collect the combined discharge of hot combustion gases from said conduit means communicating with said gas outlet cylinder ports of said plurality of piston chambers from opposite sides thereof;

a pair of multi-port slide valve members having opposite members which are linked together and slideably disposed on opposite sides of each said piston chamber in guideway means of said engine block, and disposed therein to reciprocate together;

transmission means communicating between said crankshaft and means linking members of said pair of multi-port slide valve members and disposed to continuously convert rotary motion to reciprocating motion, so that members of said pair of oppositely-disposed multi-port slide valve members reciprocate together and continuously complete each reciprocating cycle in conjunction with completion of a designed rotation of said crankshaft;

a fluid pump disposed to supply pressurized combustion air through communicating conduit means into said air inlet means of each member of said pair of oppositely-disposed manifold heat exchangers;

members of said linked pair of reciprocating multi-port slide valve members each having a plurality of inlet ports for flow of combustion air therethrough and a plurality of outlet ports for flow of combustion gases therethrough, and disposed across corresponding members of said pluralities of air supply and combustion gas discharge conduits serving each said piston chamber from opposite sides thereof to intermittently open and close members of said pluralities of air supply and combustion gas discharge conduits during reciprocation of said linked pair of reciprocating multi-port slide valve members; and members of said pluralities of inlet and outlet ports of said members of the linked pair of reciprocating multi-port slide valve members being disposed in each said slide valve member in companion sets to sequentially open each member of said pluralities of air supply and combustion gas discharge conduits serving each said piston chamber from opposite sides thereof, and supply a charge of pressurized preheated combustion air into each said piston chamber from opposite sides thereof while discharging spent combustion gases from each said piston chamber from opposite sides thereof as its corresponding said piston is near its bottom dead-center cyclic position;

whereby a charge of preheated combustion air is sequentially admitted through members of said plurality of air inlet cylinder ports into each said piston chamber while spent combustion gases are discharged through members of said plurality of gas outlet cylinder ports from each said piston chamber, as corresponding members of said pluralities of air supply and combustion gas discharge conduit serving each said piston chamber from opposite sides thereof are opened through said companion sets of inlet and outlet ports of said linked pair of reciprocating multi-port slide valve members, and members of said pluralities of air supply and combustion gas discharge conduits serving each said piston chamber are sequentially closed by said linked pair of reciprocating multi-port slide valve members during the compression stroke of the corresponding said piston.

43. The reciprocating multi-cylinder internal combustion engine of claim 42 wherein members of the said plurality of gas outlet cylinder ports serving each said piston chamber are disposed adjacent said cylinder head, and members of said plurality of air inlet cylinder ports serving each said piston chamber are disposed in an extended portion thereof opposite from members of said plurality of gas outlet cylinder ports.

44. The reciprocating multi-cylinder internal combustion engine of claim 42 wherein a plurality of liquid fuel injectors is disposed in said cylinder head, each member of said plurality of liquid fuel injectors having its outlet exposed into a corresponding member of said plurality of piston chambers, a fluid pump is disposed to supply high-pressure liquid fuel through communicating conduit means into an inlet of each said fuel injector, valve means are disposed in a fuel supply conduit branch serving each said fuel injector, and valve operating means is disposed to intermittently open each said valve means serving each said fuel injector and discharge high-pressure liquid fuel into its corresponding said piston chamber, when its corresponding said piston approaches its top dead-center cyclic position.

45. The reciprocating multi-cylinder internal combustion engine of claim 42 wherein a plurality of electrical spark plugs is disposed in said cylinder head, each member of said plurality of electrical spark plugs having its electrodes exposed into a corresponding member of said plurality of piston chambers, a source of high-voltage electrical current, electrical conductor means communicating between said source of high-voltage electrical current and a terminal of each said electrical spark plug, and electrical switch means disposed in a conductor branch communicating between said source of high-voltage electrical current and a terminal of each said electrical spark plug, to intermittently energize electrodes of each said electrical spark plug and ignite the compressed air-fuel mixture within each said piston chamber when its corresponding said piston is near its top dead-center cyclic position.

46. The reciprocating multi-cylinder internal combustion engine of claim 42 wherein each said piston member closely approaches said cylinder head at its top dead-center cyclic position to substantially reduce the volume of its corresponding said piston chamber, and the heat of compression from work done on a combustion air charge by each said piston member elevates combustion air temperature above the fuel ignition temperature to spontaneously ignite a combustible fuel supplied into its corresponding said piston chamber.

47. A reciprocating 2-stroke cycle multi-cylinder internal combustion engine having an engine block housing a plurality of piston chambers, each said piston chamber closed by a cylinder head at its high-pressure end and having a reciprocating piston slideably disposed therein to compress and expand gaseous fluids, each said reciprocating piston disposed to transmit an intermittent torque to a rotating output crankshaft of said engine, means for intermittently supplying a combustible fuel into each said piston chamber, and means for intermittently igniting a compressed air-fuel mixture within each said piston chamber, comprising in combination:

an air inlet cylinder port disposed in a portion of each said piston chamber and extending through said engine block on one side thereof, for intermittent supply of combustion air into each said piston chamber;

a gas outlet cylinder port disposed in a second portion of each said piston chamber and extending through said engine block on one side thereof, for intermittent discharge of hot combustion gases from each said piston chamber;

a multi-port slide valve member slideably disposed to reciprocate in guideway means on one side of said engine block said multi-port slide valve member having separate pairs of upper and lower ports extending therethrough and disposed to sequentially open and close said air inlet and gas outlet cylinder ports of members of said plurality of piston chambers from one side of said engine block, when said multi-port slide valve member reciprocates;

transmission means communicating between said crankshaft and said multi-port slide valve member and disposed to continuously convert rotary motion to reciprocating motion, so that said multiport slide valve member completes each reciprocating cycle in conjunction with each complete rotation of said crankshaft;

an air-preheating manifold heat exchange having separate internal fluid passageways for transit of pressurized combustion air and hot combustion gases therethrough, and disposed on one side of said engine block adjacent said plurality of piston chambers;

said manifold heat exchanger having air inlet means communicating with a first internal plenum which communicates with an elongate air outlet slot, said first internal plenum disposed to receive pressurized combustion air and intermittently distribute a charge of pressurized combustion air through said air outlet slot into a corresponding said air inlet cylinder port of each member of said plurality of piston chambers, when a respective first member of a said pair of upper and lower ports of said multi-port slide valve member is oppositely-adjacent a corresponding said air inlet cylinder port of each said piston chamber to permit a charge of pressurized combustion air to flow therethrough from said first internal plenum of said manifold heat exchanger, during reciprocation of said multi-port slide valve member;

said manifold heat exchange having an elongate gas inlet slot communication with a second internal plenum which communicates with a gas outlet means, said second internal plenum disposed to intermittently receive hot combustion gases by way of said gas inlet slot from a corresponding said gas outlet cylinder port of each member of said plurality of piston chambers, when a respective second member of a said pair of upper and lower ports of said multi-port slide-valve member is oppositely-adjacent a corresponding said gas outlet port of each said piston chamber to permit an intermittent flow of hot combustion gases therethrough and into said second internal plenum of said manifold heat exchanger, during reciprocation of said multi-port slide valve member;

a fluid pump is disposed to supply pressurized combustion air through communicating conduit means into said air inlet means of said manifold heat exchanger; and exhaust conduit means communicating with said gas outlet means of said manifold heat exchanger for discharging spent combustion gases to atmosphere;

whereby heat from hot combustion gases intermittently discharged in sequence form corresponding said gas outlet cylinder ports of members of said plurality of piston chambers and flowing through said second internal plenum of said manifold heat exchanger is absorbed by the confining walls thereof, heat is transferred by conduction and convection to preheat pressurized combustion air flowing through said first internal plenum of said manifold heat exchanger, and preheated pressurized combustion air is intermittently supplied in sequence through corresponding said air inlet cylinder ports into members of said plurality of piston chambers.

48. The reciprocating 2-stroke cycle multi-cylinder internal combustion engine of claim 47 wherein:

said air inlet cylinder port of each said piston chamber is disposed adjacent said cylinder head;

said gas outlet cylinder port of each said piston chamber is disposed in a low-pressure portion thereof adjacent the head its said piston, when said piston is at an extended position;

said upper port members of said pairs of upper and lower ports of said multi-port slide valve member are disposed linearly adjacent said air inlet cylinder ports of said plurality of piston chambers;

said lower port members of said pairs of upper and lower ports of said multi-port slide valve member are disposed linearly adjacent said gas outlet cylinder ports of said plurality of piston chambers;

said elongate air outlet slot of said manifold heat exchanger is disposed linearly adjacent said upper port members of said pairs of upper and lower ports of said multi-port slide valve member, to permit an intermittent change of pressurized preheated combustion air from said first internal plenum of said manifold heat exchanger to sequentially flow through a respective said air inlet cylinder port into each said piston chamber; and said elongate gas inlet slot of said manifold heat exchanger is disposed linearly adjacent said lower port members of said pairs of upper and lower ports of said multi-port slide valve member, to permit an intermittent discharge of hot combustion gases to flow in sequence from said gas outlet cylinder port of each said piston chamber into said second internal plenum of said manifold heat exchanger.

49. A reciprocating 2-stroke cycle multi-cylinder internal combustion engine having an engine block housing a plurality of piston chambers, each said piston chamber closed by a cylinder heat at its high-pressure end and having a reciprocating piston slideably disposed therein to compress and expand gaseous fluids, each said reciprocating piston disposed to transmit an intermittent torque to a rotating output crankshaft of said engine, means for intermittently supplying a combustible fuel into each said piston chamber, and means for intermittently igniting a compressed air-fuel mixture within each said piston chamber, comprising in combination:

- a pair of air inlet cylinder ports oppositely-disposed with respect to each other and extending through said engine block into a portion of each said piston chamber from opposite sides thereof, for intermittent supply of combustion air into each said piston chamber;
- a pair of gas outlet cylinder ports oppositely-disposed with respect to each other and extending through said engine block into a second portion of each said piston chamber from opposite sides thereof, for intermittent discharge of hot combustion gases from each said piston chamber;
- a pair of multi-port slide valve members having separated members which are linked together and slideably disposed on opposite sides of each said piston chamber in guideway means of said engine block to reciprocate together, each said slide valve member having separate pairs of upper and lower ports extending therethrough and disposed to sequentially open and close said air inlet and gas outlet cylinder ports on opposite sides of each said piston chamber, when said linked pair of multi-port slide valve members reciprocate together;
- transmission means communicating between said crankshaft and means linking members of said pair of multi-port slide valve members and disposed to continuously convert rotary motion to reciprocating motion, so that said linked pair of multi-port slide valve members completes each reciprocating cycle in conjunction with each complete rotation of said crankshaft;
- a pair of air-preheating manifold heat exchangers, each having separated internal fluid passageways for transit of pressurized combustion air and hot combustion gases therethrough, and oppositely-disposed with respect to each other on opposite sides of said engine block adjacent said plurality of piston chambers;
- each said manifold heat exchanger having air inlet means communicating with a first internal plenum which communicates with an elongate air outlet slot, said first internal plenum disposed to receive pressurized combustion air and intermittently distribute a charge of pressurized combustion air through said air outlet slot into a corresponding said air inlet cylinder port of each member of said plurality of piston chambers, when a respective first member of a said pair of upper and lower ports of the corresponding said multi-port slide valve member is oppositely-adjacent a corresponding said air inlet cylinder port on the same side of each said piston chamber to permit a charge of pressurized combustion air to flow therethrough from said first internal plenum of the corresponding said manifold heat exchanger, during reciprocation of said linked pair of multi-port slide valve members;
- each said manifold heat exchanger having an elongate gas inlet slot communicating with a second internal plenum which communicates with a gas outlet means, said second internal plenum disposed to intermittently receive hot combustion gases by way of said gas inlet slot from a corresponding said gas outlet cylinder port on the same side of each member of said plurality of piston chambers, when a respective second member of pair of upper and lower ports of the corresponding said multi-port slide valve member is oppositely-adjacent a respective said gas outlet cylinder port on the same side of each said piston chamber to permit an intermittent flow of hot combustion gases therethrough and into said second internal plenum of the corresponding said manifold heat exchanger, during reciprocation of said linked pair of multi-port slide valve members;
- a fluid pump is disposed to supply pressurized combustion air thrust communicating conduit means into said air inlet means of each said manifold heat exchanger; and
- exhaust conduit means communicating with said gas outlet means of each said manifold heat exchanger, for discharging spent combustion gases to atmosphere;
- whereby heat from hot combustion gases intermittently discharged in sequence from corresponding said gas outlet cylinder ports on opposite sides of each member of said plurality of piston chambers and flowing through said second internal plenum of each said manifold heat exchanger is absorbed by the confining walls thereof, heat is transferred by conduction and convection to preheat pressurized combustion air flowing through said first internal plenum of each said manifold heat exchanger, and pressurized preheated combustion air is intermittently supplied in sequence through corresponding said opposite air inlet cylinder ports into each said piston chamber from opposite sides of said engine block.

50. The reciprocating 2-stroke cycle multi-cylinder internal combustion engine of claim 48 wherein:
   said oppositely-disposed air inlet cylinder ports of each said piston chamber are disposed adjacent said cylinder head;
   said opposite-disposed gas outlet cylinder ports of each said piston chamber are disposed in a low-pressure portion thereof adjacent the head of its said piston, when said piston is at an extended position;
   said upper port members of said pairs of upper and lower ports of each said multi-port slide valve member are disposed linearly adjacent said air inlet cylinder ports on each side of said plurality of piston chambers;
   said lower port members of said pairs of upper and lower ports of each said multi-port slide valve member are disposed linearly adjacent said gas outlet cylinder ports on each side of said plurality of piston chambers;

said elongate air outlet slot of each said manifold heat exchanger is disposed linearly adjacent said upper port members of said pairs of upper and lower ports of its respective said multi-port slide valve member on the same side of said plurality of piston chambers, to permit an intermittent charge of pressurized preheated combustion air from said first internal plenums of said oppositely-disposed pair of manifold heat exchangers to sequentially flow through a respective said air inlet cylinder port into each said piston chamber from opposite sides thereof; and said elongate gas inlet slot of each said manifold heat exchanger is disposed linearly adjacent said lower ports members of said pairs of upper and lower ports of its respective said multi-port slide valve member on the same side of said plurality of piston chambers, to permit an intermittent discharge of hot combustion gases to flow in sequence form said gas outlet cylinder ports on the same side of said plurality of piston chambers into said second internal plenum of each said oppositely-disposed manifold heat exchanger.

51. A method for operating a reciprocating multi-cylinder internal combustion engine having an engine block housing a plurality of piston chambers; each said piston chamber closed by a cylinder head at its high-pressure end and having a reciprocating piston slideably disposed therein to compress and expand gaseous fluids; conduit means for intermittently supplying combustion air into each said piston chamber; means for intermittently supplying a combustible fuel into each said piston chamber; means for intermittently igniting a compressed air-fuel mixture within each said piston chamber; conduit means for intermittently discharging spent combustion gases from each said piston chamber; a reciprocating multi-port slide valve member slideably disposed in guideway means of said engine block across said conduit air supply means and said combustion gas discharge conduit means of said plurality of piston chambers to open and close said air supply and combustion gas discharge conduit means; said multi-port slide valve member having a companion set of inlet and outlet ports for each said piston chamber disposed therein for flow of gaseous fluids therethrough during reciprocation of said multi-port slide valve member; an air-preheating manifold heat exchanger disposed adjacent said engine block and communicating with corresponding said air supply conduit means and corresponding said combustion gas discharge conduit means of each said piston chamber; said manifold heat exchanger having air inlet and outlet means, combustion gas inlet and outlet means, and separate fluid passageways therewithin for flow of hot combustion gases and cooler combustion air therethrough; and a fluid pump, disposed to supply pressurized combustion air through communicating conduit means into said air inlet means of said manifold heat exchanger; said method comprising the steps of:

transforming rotary motion of the output crankshaft of said engine to reciprocating motion of said multi-port slide valve member in transmission means which communicates between said crankshaft and said multi-port slide valve member;.

synchronizing the reciprocation of said multi-port slide valve member with rotation of said crankshaft, so that said multi-port slide valve member continuously completes each reciprocating cycle in conjunction with completion of a designed rotation of said crankshaft;

transferring heat between hot combustion gases discharged from said plurality of piston chambers and incoming combustion air supplied from the discharge of said fluid pump through heat transfer surfaces of said manifold heat exchanger, and preheating combustion air supplied to said plurality of piston chambers of said engine;

sequentially flowing a charge of pressurized preheated combustion air into each said piston chamber from said air outlet means of said manifold heat exchanger through its conduit air supply means by way of a corresponding said inlet port of said reciprocating multi-port slide valve member, while discharging spent combustion gases from the piston chamber into said gas inlet means of said manifold heat exchanger by way of its said combustion gas discharge conduit means and its said companion outlet port of said reciprocating multi-port slide valve member;

impelling the discharge of spent combustion gases from each said piston chamber while its corresponding said piston is near its bottom dead-center cyclic position, by admitting pressurized preheated combustion air into the piston chamber which displaces and expels spent combustion gases therefrom;

stopping the flow of pressurized preheated combustion air into each said piston chamber and the discharge of gaseous fluids therefrom during the compression stroke of its corresponding said piston, when the said reciprocating multi-port slide valve member cyclically closes the said conduit air supply means and said combustion gas discharge conduit means serving the said piston chamber;

injecting a dispersed liquid fuel into each said piston chamber, during the compression stroke of its corresponding said piston, and igniting the compressed air-fuel mixture within each said piston chamber by an electric spark, as its corresponding said piston is near its top dead-center cyclic position.

52. The method of claim 51 wherein each said piston closely approaches said cylinder head at its top dead-center cyclic position to substantially reduce the volume of its said piston chamber during its compression stroke, said engine having no spark ignition means, with the additional steps of:

compressing the combustion air charge supplied into each said piston chamber until the air temperature substantially exceeds the ignition temperature of a liquid fuel;

injecting the liquid fuel as a dispersed aerosol into each said piston chamber during the compression stroke of its corresponding said piston; and spontaneously igniting the compressed air-fuel mixture within each said piston chamber, as the dispersed liquid fuel aerosol contacts the heated combustion air charge therewithin.

53. A method for operating a reciprocating multi-cylinder internal combustion engine having an engine block housing a plurality of piston chambers; each said piston chamber closed by a cylinder head at its high-pressure end and having a reciprocating piston slideably disposed therein to compress and expand gaseous fluids; conduit means for intermittently supplying combustion air into each said piston chamber from opposite sides thereof; means for intermittently supplying a combustible fuel into each said piston chamber; means for intermittently igniting a compressed air-fuel mixture within each said piston chamber; conduit means for intermittently discharging spent combustion gases from opposite sides of each said piston chamber; a linked pair of reciprocating multi-port slide valve members slideably disposed on opposite sides of said plurality of piston chambers in guideway means of said engine block across said conduit air supply means and said combustion gas discharge conduit means of each said piston chamber to open and close said air supply and combustion gas discharge conduit means; each said multi-port slide valve member having a companion set of inlet and outlet ports for each said piston chamber disposed therein for flow of gaseous fluids therethrough during reciprocation of said linked pair of reciprocating multi-port slide valve members; a pair of air-preheating manifold heat exchangers disposed on opposite sides of said engine block and communicating with corresponding said air supply conduit means and corresponding said combustion gas discharge conduit means on opposite sides of each member of said plurality of piston chambers; each said manifold heat exchanger having air inlet and outlet means,, combustion gas inlet and outlet means, and separate fluid passageways confining flow of hot combustion gases and cooler combustion air therethrough and a fluid pump disposed to supply pressurized combustion air through communicating conduit means into said air inlet means of each said manifold heat exchanger; comprising the steps of:

- transforming rotary motion of the output crankshaft of said engine to reciprocating motion of said linked pair of multi-port slide valve members in transmission means which communicates between said crankshaft and means linking said multi-port slide valve members;
- synchronizing the reciprocation of said multi-port slide valve members with rotation of said crankshaft, so that said pair of multi-port slide valve members continuously completes each reciprocating cycle in conjunction with completion of a designed rotation of said crankshaft;
- transferring heat between hot combustion gases discharged from said plurality of piston chambers and incoming combustion air supplied from the discharge of said fluid pump through heat transfer surfaces of said oppositely-disposed manifold heat exchangers, and preheating combustion air supplied to said plurality of piston chambers of said engine;
- sequentially flowing a charge of pressurized preheated combustion air into each said piston chamber from opposite sides thereof and from said air outlet means of said oppositely-disposed manifold heat exchangers through its corresponding said air supply conduit means by way of corresponding said inlet ports of said linked pair of reciprocating multi-port slide valve members, while discharging spent combustion gases from the piston chamber into said gas inlet means of said opposite manifold heat exchangers by way of its corresponding said combustion gas discharge conduit means and corresponding, said companion outlet ports of said linked pair of reciprocating multi-port slide valve members.
- impelling the discharge of spent combustion gases from each said piston chamber from opposite sides thereof while its corresponding said piston is near its bottom dead-center cyclic position, by admitting pressurized preheated combustion air into the piston chamber from opposite sides thereof which displaces and expels spent combustion gases therefrom;
- stopping the flow of pressurized preheated combustion air into each said piston chamber and the discharge of gaseous fluids therefrom during the compression stroke of its corresponding said piston, when the said linked pair of reciprocating multi-port slide valve members cyclically closes said conduit air supply means and said combustion gas discharge means serving the said piston chamber;
- injecting a dispersed liquid fuel into each said piston chamber during the compression stroke of its corresponding said piston, and
- igniting the compressed air-fuel mixture within each said piston chamber by an electric spark, as its corresponding said piston is near its top dead-center cyclic position.

54. The method of claim 53 wherein each said piston closely approaches said cylinder head at its top dead-center cyclic position to substantially reduce the volume of its said piston chamber during its compression stroke, said engine having no spark ignition means, with the additional steps of:

- compressing the combustion air charge supplied into each said piston chamber until the air temperature substantially exceeds the ignition temperature of a liquid fuel;
- injecting the liquid fuel as a dispersed aerosol into each said piston chamber during the compression stroke of its corresponding said piston; and
- spontaneously igniting the compressed air-fuel mixture within each said piston chamber, as the dispersed liquid fuel aerosol contacts the heated combustion air charge therewithin.

* * * * *